United States Patent
Asada et al.

(10) Patent No.: US 11,970,562 B2
(45) Date of Patent: Apr. 30, 2024

(54) RETARDATION FILM AND PRODUCTION METHOD FOR RETARDATION FILM

(71) Applicant: ZEON CORPORATION, Tokyo (JP)

(72) Inventors: Takeshi Asada, Tokyo (JP); Hironari Sudeji, Tokyo (JP); Kensaku Fujii, Tokyo (JP); Yusuke Yasu, Tokyo (JP); Hiroya Nishioka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 862 days.

(21) Appl. No.: 16/981,694

(22) PCT Filed: Mar. 18, 2019

(86) PCT No.: PCT/JP2019/011287
§ 371 (c)(1),
(2) Date: Sep. 17, 2020

(87) PCT Pub. No.: WO2019/181892
PCT Pub. Date: Sep. 26, 2019

(65) Prior Publication Data
US 2021/0009744 A1 Jan. 14, 2021

(30) Foreign Application Priority Data

Mar. 19, 2018 (JP) ................. 2018-051030
Nov. 30, 2018 (JP) ................. 2018-225684

(51) Int. Cl.
| | | |
|---|---|---|
| C08F 297/04 | (2006.01) | |
| B29C 48/08 | (2019.01) | |
| B29C 48/88 | (2019.01) | |
| B29C 55/06 | (2006.01) | |
| B29K 23/00 | (2006.01) | |

(Continued)

(52) U.S. Cl.
CPC .......... C08F 297/046 (2013.01); B29C 48/08 (2019.02); B29C 48/914 (2019.02);
(Continued)

(58) Field of Classification Search
CPC .................................................. C08F 297/046
See application file for complete search history.

(56) References Cited

U.S. PATENT DOCUMENTS

| | | | |
|---|---|---|---|
| 6,565,974 B1 | 5/2003 | Uchiyama et al. | |
| 2010/0283949 A1 | 11/2010 | Uchiyama et al. | |
| 2016/0146977 A1 | 5/2016 | Ishiguro et al. | |

FOREIGN PATENT DOCUMENTS

| | | |
|---|---|---|
| JP | H05164920 A | 6/1993 |
| JP | 3031014 B2 | 4/2000 |

(Continued)

OTHER PUBLICATIONS

Machine-generated English-language translation of JP-2006111650-A.*

(Continued)

*Primary Examiner* — Vu A Nguyen
(74) *Attorney, Agent, or Firm* — KENJA IP LAW PC

(57) ABSTRACT

A phase difference film composed of a resin containing a copolymer including polymerization units A and B, the phase difference film including a cylindrical phase separation structure that generates a structural birefringence, the phase separation structure including a phase (A) having the polymerization unit A as a main component and a phase (B) having the polymerization unit B as a main component, and the phase difference film satisfying the following condition (1) or (2). Condition (1): D(A)>D(B) and f(B)>0.5, and a direction giving a maximum refractive index among in-plane directions and an orientation direction of a cylinder in the phase separation structure are parallel to each other. Condition (2): D(A)>D(B) and f(A)>0.5, and a direction giving a maximum refractive index among in-plane directions and an orientation direction of a cylinder in the phase separation structure are orthogonal to each other.

13 Claims, 1 Drawing Sheet

(51) Int. Cl.
  *B29K 25/00* (2006.01)
  *B29K 105/00* (2006.01)
  *C08J 5/18* (2006.01)
  *G02B 1/04* (2006.01)
  *G02B 5/30* (2006.01)
  *B29L 31/34* (2006.01)
(52) U.S. Cl.
  CPC ............. *B29C 55/06* (2013.01); *C08J 5/18* (2013.01); *G02B 1/04* (2013.01); *G02B 5/3083* (2013.01); *B29K 2023/18* (2013.01); *B29K 2025/00* (2013.01); *B29K 2105/0085* (2013.01); *B29K 2995/0034* (2013.01); *B29L 2031/3475* (2013.01); *C08J 2353/02* (2013.01)

(56) References Cited

FOREIGN PATENT DOCUMENTS

| JP | 2006111650 | A | * | 4/2006 |
| JP | 2006111650 | A | | 4/2006 |
| JP | 2006142561 | A | | 6/2006 |
| JP | 2006143799 | A | | 6/2006 |
| JP | 2006348096 | A | | 12/2006 |
| JP | 2011013378 | A | | 1/2011 |
| TW | 201515838 | A | | 5/2015 |
| WO | 0026705 | A1 | | 5/2000 |
| WO | 2008146924 | A1 | | 12/2008 |
| WO | 2015002020 | A1 | | 1/2015 |
| WO | 2015005292 | A1 | | 1/2015 |

OTHER PUBLICATIONS

M. W. Matsen, Macromolecules 2012, 45, 2161-2165.*
Jun. 11, 2019, International Search Report issued in the International Patent Application No. PCT/JP2019/011287.
Sep. 8, 2023, Office Action issued by the United States Patent and Trademark Office in the U.S. Appl. No. 16/981,693.

* cited by examiner

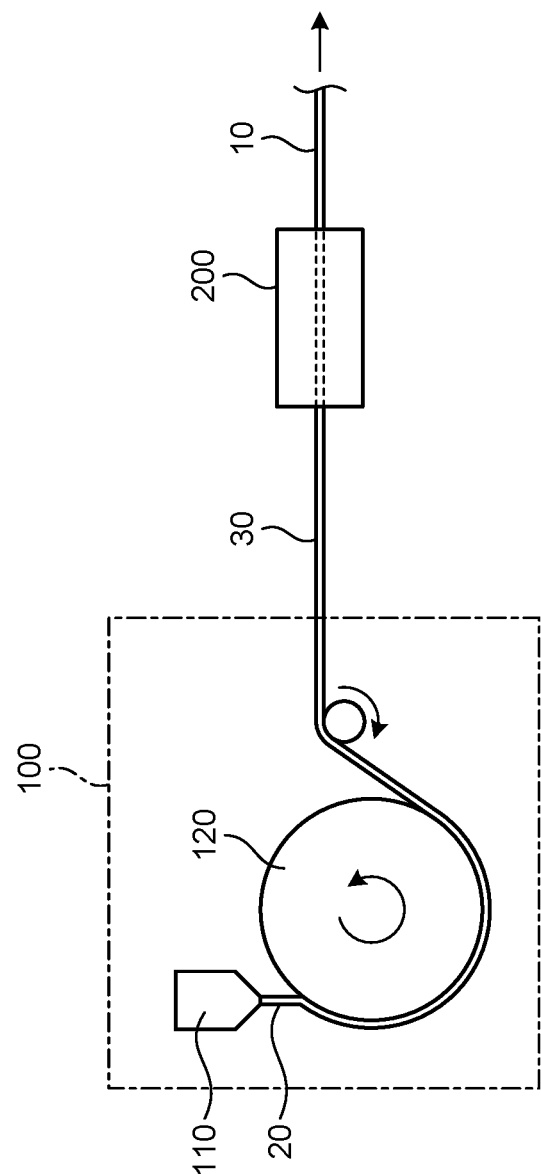

RETARDATION FILM AND PRODUCTION METHOD FOR RETARDATION FILM

FIELD

The present invention relates to a phase difference film and a method for producing a phase difference film.

BACKGROUND

Various types of phase difference films are often disposed in a display device such as a liquid crystal display device for the purpose of improving display quality thereof. As the phase difference film, a film having a multilayer structure (Patent Literatures 1 and 2) and a film using a block copolymer having a lamellar structure (Patent Literature 3) have been developed. Further, an optical film formed from a resin has been known (Patent Literatures 4 to 9).

CITATION LIST

Patent Literature

Patent Literature 1: Japanese Patent Application Laid-Open No. 2011-013378 A
Patent Literature 2: International Publication No. 2008/146924
Patent Literature 3: Japanese Patent Application Laid-Open No. Hei. 05-164920 A
Patent Literature 4: Japanese Patent Application Laid-Open No. 2006-111650 A
Patent Literature 5: Japanese Patent Application Laid-Open No. 2006-143799 A
Patent Literature 6: Japanese Patent Application Laid-Open No. 2006-348096 A
Patent Literature 7: Japanese Patent Application Laid-Open No. 2006-142561 A
Patent Literature 8: International Publication No. 2000/026705 (corresponding publication: U.S. Pat. No. 6,565,974)
Patent Literature 9: International Publication No. 2015/005292

SUMMARY

Technical Problem

The film in Patent Literature 2, in which the desired optical properties are achieved by combining a large number of layers, has a complicated structure, thus causing a high production cost of the phase difference film and a low productivity.

Further, it is desirable that the variation of optical properties of the phase difference film due to difference of a wavelength of light passing therethrough is kept at a low level. For this reason, the phase difference film preferably has a reverse wavelength dispersion property. The term "reverse wavelength dispersion property" described herein refers to a property of film satisfying Re(450)/Re(550)<1. "Re(450)" described herein refers to the retardation of a film in the in-plane direction measured at a wavelength of 450 nm, while "Re(550)" refers to the retardation of the film in the in-plane direction measured at a wavelength of 550 nm.

Thus, there have been demanded a phase difference film which has a reverse wavelength dispersion property and can be easily produced at a low cost; and a method for producing such a phase difference film.

Solution to Problem

The present inventor has conducted intense research to solve the aforementioned problems. As a result, the present inventor has found that the aforementioned problems can be solved by constituting a cylindrical phase separation structure generating a structural birefringence by using a resin including a specific copolymer P and arranging the orientation direction of the cylinder in the phase separation structure to a specific direction, thereby completing the present invention.

That is, the present invention provides the following.

<1> A phase difference film composed of a resin C containing a copolymer P including a polymerization unit A and a polymerization unit B,
the phase difference film including a cylindrical phase separation structure that generates a structural birefringence,
the phase separation structure including a phase (A) having the polymerization unit A as a main component and a phase (B) having the polymerization unit B as a main component, and
the phase difference film satisfying the following condition (1) or (2),
Condition (1): D(A)>D(B) and f(B)>0.5, and a direction giving a maximum refractive index among in-plane directions and an orientation direction of a cylinder in the phase separation structure are parallel to each other, and
Condition (2): D(A)>D(B) and f(A)>0.5, and a direction giving a maximum refractive index among in-plane directions and an orientation direction of a cylinder in the phase separation structure are orthogonal to each other,
wherein
f(A) represents a total weight ratio of the polymerization unit A in the copolymer P,
f(B) represents a total weight ratio of the polymerization unit B in the copolymer P, $$D(A)=\text{Re }A(450)/\text{Re }A(550),$$

$$D(B)=\text{Re }B(450)/\text{Re }B(550),$$

ReA(450) represents an in-plane direction retardation (nm) of a film (A) formed from a polymer (A) composed of the polymerization unit A measured at a wavelength of 450 nm,
ReA(550) represents an in-plane direction retardation (nm) of the film (A) measured at a wavelength of 550 nm,
ReB(450) represents an in-plane direction retardation (nm) of a film (B) formed from a polymer (B) composed of the polymerization unit B measured at a wavelength of 450 nm, and
ReB(550) represents an in-plane direction retardation (nm) of the film (B) measured at a wavelength of 550 nm.
<2> The phase difference film according to <1>, wherein an in-plane direction retardation Re(550) measured at a wavelength of 550 nm is 100 nm or more and 300 nm or less.
<3> The phase difference film according to <1> or <2>, wherein a ratio (Re(450)/Re(550)) of an in-plane direction retardation Re(450) measured at a wavelength of 450 nm relative to an in-plane direction retardation Re(550) measured at a wavelength of 550 nm is 0 or more and less than 1.
<4> The phase difference film according to any one of <1> to <3>, wherein a diameter of the cylinder in the phase separation structure is 50 nm or less.

<5> The phase difference film according to any one of <1> to <4>, wherein an absolute value (|n(a)−n(b)|) of a difference between a refractive index n(a) of the polymer (A) and a refractive index n(b) of the polymer (B) is 0.05 or more.

<6> The phase difference film according to any one of <1> to <5>, wherein an interphase distance in the phase separation structure is 200 nm or less.

<7> The phase difference film according to any one of <1> to <6>, wherein the copolymer P is a block polymer having a block (A) having the polymerization unit A as a main component and a block (B) having the polymerization unit B as a main component.

<8> The phase difference film according to any one of <1> to <7>, wherein
the copolymer P includes a triblock copolymer P', and
the triblock copolymer P' is an (A)-(B)-(A) triblock copolymer having a block (A) having a polymerization unit A as a main component and a block (B) having a polymerization unit B as a main component.

<9> The phase difference film according to any one of <1> to <8>, wherein
the copolymer P includes a pentablock copolymer P''', and
the pentablock copolymer P''' is an (A)-(B)-(A)-(B)-(A) pentablock copolymer having a block (A) having the polymerization unit A as a main component and a block (B) having the polymerization unit B as a main component.

<10> The phase difference film according to any one of <1> to <9>, wherein an intrinsic birefringence of the copolymer P is negative.

<11> The phase difference film according to any one of <1> to <10>, satisfying 0.9> f(A)>0.5 and 0.9> f(B) >0.5.

<12> A method for producing the phase difference film according to any one of <1> to <11>, the method comprising:
a first step of performing melt extrusion of the resin C including the copolymer P having the polymerization unit A and the polymerization unit B onto a cooling roll to obtain an intermediate film; and
a second step of subjecting the intermediate film to a stretching treatment, wherein
a thermal softening temperature Td of the copolymer P and a temperature Tc of the cooling roll satisfy the following formula (3):

$$Tc<Td-50° C. \tag{3}$$

<12-1> The method for producing a phase difference film according to <12>, wherein an extrusion temperature of the resin C in the first step is Td+110° C. or higher and Td+170° C. or lower.

<12-2> The method for producing a phase difference film according to <12> or <12-1>, wherein a stretching temperature in the stretching treatment in the second step is Td or higher and Td+20° C. or lower, and a stretching ratio in the stretching treatment in the second step is 1.1 times or more and 5.0 times or less.

<12-3> The method for producing the phase difference film according to any one of <12>, <12-1>, and <12-2>, wherein an in-plane direction retardation Re(450) of the phase difference film at a measurement wavelength of 450 nm, an in-plane direction retardation Re(550) of the phase difference film at a measurement wavelength of 550 nm, and an in-plane direction retardation Re(650) of the phase difference film at a measurement wavelength of 650 nm satisfy the following formula (4) and formula (5).

$$0.70≤Re(450)/Re(550)≤0.95 \tag{4}$$

$$1.02≤Re(650)/Re(550)≤1.20 \tag{5}$$

<13> The method for producing a phase difference film according to any one of <12>, <12-1>, <12-2>, and <12-3>, wherein the condition (2) is satisfied.

The present disclosure also provides the following.

[1B] A method for producing a phase difference film including:
a first step of performing melt extrusion of a resin C including a copolymer P having a polymerization unit A and a polymerization unit B onto a cooling roll to obtain an intermediate film; and
a second step of subjecting the intermediate film to a stretching treatment, wherein
the polymerization unit A is an aromatic vinyl-based unit and the polymerization unit B is a hydrogenated chain conjugated diene-based unit;
a total weight ratio f(A) of the polymerization unit A in the copolymer P satisfies the following formula (1C); and
a thermal softening temperature Td of the copolymer P and a temperature Tc of the cooling roll satisfy the following formula (3):

$$0.5<f(A)≤0.85 \tag{1C},$$

$$Tc<Td-50° C. \tag{3}.$$

[2B] The method for producing a phase difference film according to [1B], wherein the extrusion temperature of the resin in the first step is Td+110° C. or higher and Td+170° C. or lower.

[3B] The method for producing a phase difference film according to [1B] or [2B], wherein the stretching temperature in the stretching treatment in the second step is Td or higher and Td+20° C. or lower, and the stretching ratio in the stretching treatment in the second step is 1.1 times or more and 5.0 times or less.

[4B] The method for producing a phase difference film according to any one of [1B] to [3B], wherein the in-plane direction retardation Re(450) of the phase difference film at a measurement wavelength of 450 nm, the in-plane direction retardation Re(550) of the phase difference film at a measurement wavelength of 550 nm, and the in-plane direction retardation Re(650) of the phase difference film at a measurement wavelength of 650 nm satisfy the following formula (4) and formula (5).

$$0.70≤Re(450)/Re(550)≤0.95 \tag{4}$$

$$1.02≤Re(650)/Re(550)≤1.20 \tag{5}$$

Advantageous Effects of Invention

According to the present invention, there can be provided a phase difference film which has a reverse wavelength dispersion property and can be easily produced at a low cost; and a method for producing such a phase difference film.

BRIEF DESCRIPTION OF DRAWINGS

FIG. 1 is a schematic diagram schematically showing a scheme of producing a phase difference film by a producing method according to an embodiment of the present invention

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with a length that is 5 times or more the width, and preferably a film with a length that is 10 times or more the width, and specifically refers to a film having a length that allows a film to be wound up into a rolled shape for storage or transportation. The upper limit of the length of the film is not particularly limited, and may be 100,000 times or less the width.

In the following description, a "plate" encompasses not only a rigid member, but also a flexible member such as a resin film.

In the following description, an in-plane direction retardation Re of a film is a value represented by "Re=(nx−ny)×d" unless otherwise specified. A thickness-direction retardation Rth of a film is a value represented by "Rth=[{(nx+ny)/2}−nz]×d" unless otherwise specified. Herein, nx represents a refractive index in a direction in which the maximum refractive index is given among directions perpendicular to the thickness direction of the film (in-plane directions), ny represents a refractive index in a direction, among the above-mentioned in-plane directions of the film, perpendicular to the direction giving nx, nz represents a refractive index in the thickness direction of the film, and d represents the thickness of the film. The measurement wavelength is 550 nm, unless otherwise specified.

Whether an intrinsic birefringence value of a polymer is positive or negative is defined by the refractive index behavior of a molded product of the polymer of interest upon being stretched. That is, a polymer having a positive intrinsic birefringence value is a polymer giving a molded product of which the refractive index in the stretching direction increases after stretching. Further, a polymer having a negative intrinsic birefringence value is a polymer giving a molded product of which the refractive index in the stretching direction decreases after stretching. The intrinsic birefringence value may be calculated from the dielectric constant distribution.

Further, the phrase "a specific polymerization unit having a positive intrinsic birefringence value" means that the polymer composed of only the polymerization unit of interest has a positive intrinsic birefringence value, while the phrase "a specific polymerization unit having a negative intrinsic birefringence value" means that the polymer composed of only the polymerization unit of interest has a negative intrinsic birefringence value. Thus, whether an intrinsic birefringence value of a polymerization unit is positive or negative can be easily determined by preparing a homopolymer composed of only the polymerization unit of interest, molding the polymer into a molded product of any shape, stretching the molded product, and measuring the optical properties thereof. It is generally known that many of polymerization units of hydrocarbons such as alkene and diene have a positive intrinsic birefringence value, while many of polymers of hydrocarbons having an aromatic ring in a side chain such as styrene and vinylnaphthalene have a negative intrinsic birefringence value.

In the following description, a front direction of a certain film means the normal direction of the principal surface of the film, and specifically refers to a direction at the polar angle 0° and the azimuth angle 0° of the principal surface, unless otherwise specified.

In the following description, a tilted direction of a certain film means a direction which is neither parallel nor perpendicular to the principal surface of the film, and specifically refers to a direction in a polar angle range of larger than 0° and smaller than 90° of the principal surface, unless otherwise specified.

In the following description, a direction of an element being "parallel", "perpendicular" or "orthogonal" may allow an error within the range of not impairing the advantageous effects of the present invention, for example, within a range of ±3°, ±2°, or ±1°, unless otherwise specified.

In the following description, a slow axis of a film represents a slow axis in the plane of the film, unless otherwise specified.

In the following description, a polymerization unit having a structure formed by polymerization of a certain monomer may be expressed using the name of the monomer. For example, a polymerization unit having a structure formed by polymerization of 2-vinylnaphthalene may be referred to as a "2-vinylnaphthalene unit", and a polymerization unit having a structure formed by polymerization of isoprene may be referred to as an "isoprene unit".

[1. Phase Difference Film]

The phase difference film of the present embodiment is formed of a resin C.

[1.1. Resin C]

The resin C contains a specific copolymer P. The copolymer P includes a polymerization unit A and a polymerization unit B. The copolymer P is preferably a block copolymer having a block (A) having the polymerization unit A as a main component and a block (B) having the polymerization unit B as a main component. Generally, a block copolymer is a polymer having a molecular structure in which a plurality of types of blocks are connected, and each block is a chain formed by connecting polymerization units. A specific block copolymer in an embodiment of the present invention has specific blocks (A) and (B). In the following description, such a specific block copolymer may be simply referred to as a "block copolymer". Herein, the polymerization unit which is a main component in a certain block means a polymerization unit which is contained in an amount of 50% by weight or more relative to the total weight of the polymerization units constituting the block. The resin C containing the copolymer P is usually a thermoplastic resin.

The polymerization unit A is preferably an aromatic vinyl-based unit. The aromatic vinyl-based unit refers to a polymerization unit having a structure obtained by polymerization of an aromatic vinyl-based compound. Such an aromatic vinyl-based compound includes an aromatic vinyl compound and a derivative thereof. The aromatic vinyl compound refers to a hydrocarbon compound having a structure in which a vinyl group is bonded to an aromatic ring. The derivative of the aromatic vinyl compound includes a compound having a structure in which one or more hydrogen atoms of the aromatic vinyl compound are substituted with a substituent. The aromatic vinyl-based unit includes a polymerization unit obtained by any appropriate producing method as long as the unit has the foregoing structure.

The polymerization unit A may have a negative intrinsic birefringence value. On the other hand, the polymerization unit B may have a positive intrinsic birefringence value.

Preferable examples of the polymerization unit A may include a unit represented by the following general formula (A). The unit represented by the following general formula (A) is an aromatic vinyl-based unit.

$R^c$ is a group selected from the group consisting of a phenyl group, a biphenylyl group (for example, a 4-biphenylyl group, a 2-biphenylyl group, and a 3-biphenylyl group), a naphthyl group (for example, a 1-naphthyl group and a 2-naphthyl group), an anthracenyl group (for example, an anthracene-1-yl group, an anthracene-2-yl group, and an anthracene-9-yl group), a phenanthrenyl group (for example, a phenanthrene-1-yl group, a phenanthrene-2-yl group, a phenanthrene-3-yl group, a phenanthrene-4-yl group, and a phenanthrene-9-yl group), a naphthacenyl group, (for example, a naphthacene-1-yl group, a naphthacene-2-yl group, and a naphthacene-5-yl group), a pentacenyl group (for example, a pentacene-1-yl group, a pentacene-2-yl group, a pentacene-5-yl group, and a pentacene-6-yl group), and a terphenylyl group.

$R^1$ to $R^3$ are each independently a group selected from the group consisting of a hydrogen atom and an alkyl group of 1 to 12 carbon atoms. Examples of such an alkyl group may include a methyl group, an ethyl group, a propyl group, and an hexyl group.

In the formula (A), $R^1$ is preferably a hydrogen atom.

$R^2$ and $R^3$ are preferably a hydrogen atom.

$R^c$ is preferably a naphthyl group.

More preferably, $R^2$ and $R^3$ are each a hydrogen atom and $R^c$ is a naphthyl group, or $R^2$ and $R^3$ are each a hydrogen atom and $R^1$ is a hydrogen atom. More preferably, $R^2$ and $R^3$ are each a hydrogen atom, $R^c$ is a naphthyl group, and $R^1$ is a hydrogen atom.

The polymerization unit A may be obtained by polymerization of a monomer (a) which gives the polymerization unit A. Examples of the monomer (a) may include an aromatic vinyl-based compound (for example, vinylnaphthalene and its derivatives). Examples of the vinylnaphthalene may include 1-vinylnaphthalene and 2-vinylnaphthalene. Examples of the vinylnaphthalene derivatives may include α-methyl-1-vinylnaphthalene, α-ethyl-1-vinylnaphthalene, α-propyl-1-vinylnaphthalene, α-hexyl-1-vinylnaphthalene, α-methyl-2-vinylnaphthalene, α-ethyl-2-vinylnaphthalene, α-propyl-2-vinylnaphthalene, and α-hexyl-2-vinylnaphthalene. As the vinylnaphthalene and its derivatives, 2-vinylnaphthalene is preferable from the viewpoint of convenient industrial availability.

The copolymer P may solely have only one type thereof as the polymerization unit A, or may have two or more types thereof in combination at any ratio. Therefore, as the monomer (a) for forming the polymerization unit A, one type thereof may be solely used, and two or more types thereof may also be used in combination at any ratio.

The polymerization unit B is preferably a hydrogenated chain conjugated diene-based unit. The hydrogenated chain conjugated diene-based unit refers to a polymerization unit having a structure obtained by polymerization of a chain conjugated diene-based compound and hydrogenating the product. The chain conjugated diene-based compound includes a chain conjugated diene compound and its derivatives. The chain conjugated diene compound refers to a chain hydrocarbon compound having a conjugated diene structure. The derivative of the chain conjugated diene compound includes a compound having a structure in which one or more hydrogen atoms of the chain conjugated diene compound are substituted with a substituent. The hydrogenated chain conjugated diene-based unit includes a polymerization unit obtained by any appropriate producing method as long as the unit has the foregoing structure.

Preferable examples of the polymerization unit B may include units represented by the following general formula (B-1) and units represented by the following general formula (B-2). The units represented by the following general formulae (B-1) and (B-2) are hydrogenated chain conjugated diene-based units.

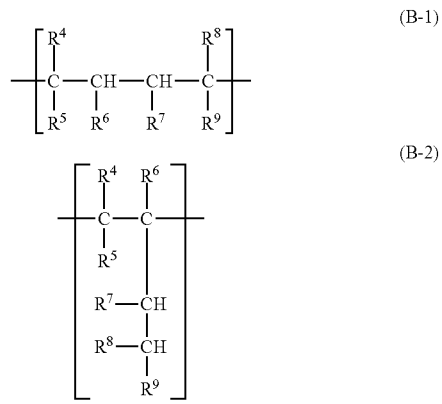

$R^4$ to $R^9$ are each independently a group selected from the group consisting of a hydrogen atom and an alkyl group of 1 to 6 carbon atoms. Examples of such an alkyl group may include a methyl group, an ethyl group, a propyl group, and a hexyl group. It is preferable that $R^4$ to $R^9$ are each independently a hydrogen atom or a methyl group.

Particularly preferable examples of the polymerization unit B may include polymerization units represented by any of the following formulae (b-1) to (b-5). The polymerization unit represented by any of formulae (b-1) to (b-3) represents a hydrogenated isoprene unit. The polymerization unit represented by the formula (b-4) or (b-5) represents a hydrogenated butadiene unit.

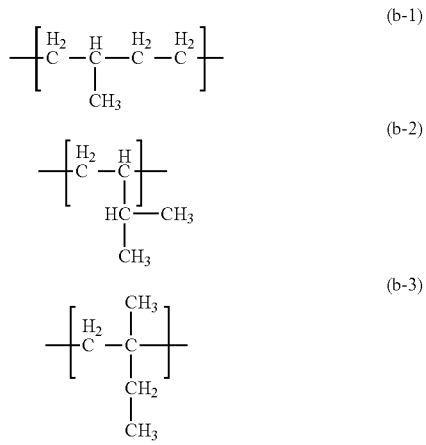

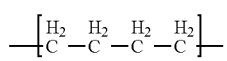

(b-4)

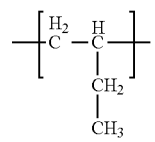

(b-5)

The polymerization unit B may be obtained by polymerization of a monomer (b), which can give the polymerization unit B, to produce a polymerization unit, and subsequent hydrogenation of double bonds, if any, in the polymerization unit. Examples of the monomer (b) may include a compound represented by the following general formula (bm).

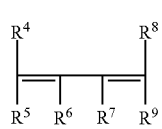

(bm)

Preferable examples of the monomer (b) may include butadiene (all of $R^4$ to $R^9$ in the formula (bm) are a hydrogen atom), isoprene ($R^6$ or $R^7$ of $R^4$ to $R^9$ in the formula (bm) is a methyl group and the other groups are each a hydrogen atom), 1,3-pentadiene, 2,3-dimethyl-1,3-butadiene, 1,3-hexadiene, 2-methyl-1,3-pentadiene, 3-methyl-1,3-pentadiene, and 2,4-dimethyl-1,3-pentadiene. Among these, butadiene and isoprene are more preferable from the viewpoint of obtaining the resin C excellent in transparency, heat resistance, and processability. Preferable examples of the polymerization unit B may include ones with the same substituents as $R^4$ to $R^9$ of the preferable examples of the monomer (b) as the $R^4$ to $R^9$.

When the polymerization unit B is a chain conjugated diene-based unit, the hydrogenation rate of the double bonds of the chain conjugated diene-based unit is preferably 90% or more, more preferably 95% or more, and particularly preferably 97% or more. When the hydrogenation rate is high as described above, the phase difference film having desired optical properties can be produced particularly easily. Furthermore, the mechanical properties of the phase difference film can be usually improved. The hydrogenation rate may be measured by $^1$H-NMR.

The copolymer P may solely have only one type thereof as the polymerization unit B, or may have two or more types thereof in combination at any ratio. Therefore, as the monomer (b) for forming the polymerization unit B, one type thereof may be solely used, and two or more types thereof may also be used in combination at any ratio.

When the copolymer P has the block (A), the block (A) may have an optional polymerization unit other than the polymerization unit A. Examples of such an optional polymerization unit may include a unit formed by polymerization of an optional monomer copolymerizable with the monomer (a) and a unit formed by hydrogenation of the foregoing unit.

When the copolymer P has the block (B), the block (B) may have an optional polymerization unit other than the polymerization unit B. Examples of such an optional polymerization unit may include a polymerization unit that is formed by polymerization of the monomer (b) and has unhydrogenated double bonds, a unit formed by polymerization of an optional monomer copolymerizable with the monomer (b), and a unit formed by hydrogenation of the foregoing units.

However, from the viewpoint of the optical properties and mechanical properties exhibited by the resin C, it is preferable that the ratio of the polymerization unit A in the block (A) and the ratio of the polymerization unit B in the block (B) are both high. The ratio of the polymerization unit A in the block (A) is preferably 50% by weight or more, more preferably 75% by weight or more, and still more preferably 95% by weight or more, and is preferably 100% by weight or less, and particularly preferably, the block (A) is composed only of the polymerization unit A. The ratio of the polymerization unit B in the block (B) is preferably 50% by weight or more, more preferably 75% by weight or more, and still more preferably 95% by weight or more, and is preferably 100% by weight or less, and particularly preferably, the block (B) is composed only of the polymerization unit B.

The blocks (A) and (B) are preferably incompatible with each other. The incompatibility of these makes it easier to obtain a phase separation structure in the phase difference film. Whether the blocks (A) and (B) are incompatible may be determined on the basis of the compatibility of the homopolymer consisting of the polymerization unit A and the homopolymer consisting of the polymerization unit B, which have a molecular weight equivalent to the size of these blocks in the block copolymer. The compatibility of such homopolymers may be determined on the basis of whether or not the phases are separated from each other when these homopolymers are mixed to form a mixture and the mixture is placed at a temperature at which the homopolymers are melted.

The molecular structure of the copolymer P is not particularly limited as long as it has the polymerization unit A and the polymerization unit B, and may be a molecular structure having any optional structure. For example, when the copolymer P is a block copolymer, the block copolymer may be a linear-type block copolymer or a graft-type block copolymer.

Examples of the linear-type block copolymer may include: a diblock copolymer having a block configuration of (A)-(B) in which the blocks (A) and (B) are connected to each other; a triblock copolymer (in the present application, which may be referred to as "triblock copolymers P'") having a block configuration of (A)-(B)-(A) in which the block (A), the block (B), and another block (A) are connected in that order; a pentablock copolymer (in the present application, which may be referred to as a "pentablock copolymer P'") having a block configuration in which three blocks (A) and two blocks (B) are connected in the order of (A)-(B)-(A)-(B)-(A); and a linear block copolymer having a block configuration in which a greater number of blocks are connected. Examples of the block configuration in which a greater number of blocks are connected may include (A)-((B)-(A))n-(B)-(A), and (B)-((A)-(B))n-(A)-(B) (n is an integer greater than or equal to 1).

Examples of the graft type block copolymer may include a block copolymer having a block configuration of (A)-g-(B) in which the block (B) is connected as a side chain to the block (A).

From the viewpoint of desired optical properties exhibited by the resin C, the copolymer P may preferably be a block copolymer having a molecular structure having two or more polymer blocks (A) and one or more polymer blocks (B) per molecule. More preferably, the block copolymer may be a triblock copolymer having a block configuration of (A)-(B)-(A).

In yet another embodiment, the block copolymer may preferably be a pentablock copolymer having a block configuration of (A)-(B)-(A)-(B)-(A).

The resin C may solely contain only one type thereof as the copolymer P, or may contain a combination of two or more types thereof at any ratio.

The copolymer P preferably has a negative intrinsic birefringence value. Such a negative intrinsic birefringence value may be imparted to the copolymer P by adjusting the ratio of the polymerization units therein. Specifically, a copolymer having a negative intrinsic birefringence value may be obtained by adjusting the weight fraction of the polymerization units having a negative intrinsic birefringence value among the polymerization units constituting the copolymer P. When the copolymer P has a negative intrinsic birefringence value, desired optical properties can be easily imparted to the phase difference film.

The resin C may be composed only of the copolymer P or may contain an optional component in addition to the copolymer P. Examples of the optional components may include an additive such as a dye, a pigment, and an antioxidant. The ratio of such an optional component may be set to fall within a range that does not impair the advantageous effects of the present invention. Specifically, the ratio of the copolymer P in the resin C is preferably 98% by weight or more, and more preferably 99% by weight or more, and is preferably 100% by weight or less, and even more preferably, the resin C is composed only of the copolymer P.

The thermal softening temperature Td of the copolymer P is preferably 100° C. or higher, more preferably 110° C. or higher, still more preferably 115° C. or higher, and particularly preferably 120° C. or higher, and is preferably 155° C. or lower, more preferably 150° C. or lower, and particularly preferably 145° C. or lower. When the thermal softening temperature Td of the copolymer P is equal to or higher than the lower limit value of the foregoing range, a phase difference film having excellent heat resistance can be obtained. When the thermal softening temperature Td of the copolymer P is equal to or lower than the upper limit value of the above-described range, molding property of the resin can be improved, so that the phase difference film can be easily produced. Further, when the thermal softening temperature Td of the copolymer P falls within the above-described range, usually a phase difference film having desired optical properties can be particularly easily produced.

The thermal softening temperature Td of the copolymer P may be measured by thermomechanical analysis (TMA). Specifically, the thermal softening temperature Td may be measured by the method described in Examples.

The molecular weight of the copolymer P may be appropriately adjusted within a range in which a phase difference film having preferable optical properties can be obtained. The weight-average molecular weight Mw of the copolymer P may be within a range of, for example, 30,000 to 400,000. The weight-average molecular weight Mw of the copolymer P is preferably 20,000 or more and 300,000 or less, more preferably 30,000 or more and 250,000 or less. The weight-average molecular weight Mw may be measured as a polystyrene-equivalent value by gel permeation chromatography (GPC) using tetrahydrofuran as an eluent.

[1.2. Structure Included in Phase Difference Film]

The phase difference film includes a cylindrical phase separation structure that generates the structural birefringence. The phase separation structure is formed in a layer of the resin C constituting the phase difference film. The phase separation structure in the resin C refers to a structure in which, as a result of self-organization of a portion constituted of the polymerization unit A (for example, block (A)) and a portion constituted of the polymerization unit B (for example, block (B)) of the copolymer P in the resin C, a phase having the polymerization unit A as a main component (also referred to as phase (A)) and a phase having the polymerization unit B as a main component (also referred to as phase (B)) are separated into distinguishable separate phases in the layer. In the following description, these phases may be simply referred to as "phase of polymerization unit A" and "phase of polymerization unit B". The term "cylindrical phase separation structure" refers to a structure in which one phase serves as a matrix and the other phase shows a cylindrical structure. The orientation layer having such a phase separation structure can generate the structural birefringence when the structure is sufficiently smaller than the wavelength of light.

The polymerization unit as a main component in a phase refers to a polymerization unit included by 50% by weight or more relative to the total weight of the polymerization units constituting the phase.

The polymerization unit A may preferably be contained in an amount of 80% by weight or more, more preferably 95% by weight or more, and still more preferably 99% by weight or more, and 100% by weight or less, relative to the total weight of the polymerization units constituting the phase (A). The polymerization unit B may preferably be contained in an amount of 80% by weight or more, more preferably 95% by weight or more, and still more preferably 99% by weight or more, and 100% by weight or less, relative to the total weight of the polymerization units constituting the phase (B).

When the copolymer P is a block copolymer having the block (A) having the polymerization unit A as a main component and the block (B) having the polymerization unit B as a main component, the phase (A) is usually constituted of the block (A), and the phase (B) is usually constituted of the block (B).

As exemplified by the phase separation structure, the structural birefringence is birefringence generated in a structure including a plurality of types of phases having different refractive indices. For example, when in a structure a phase having a refractive index of n2 exists in an inside of a phase having a refractive index of n1, the refractive index n2 being different from n1, such a structure can generate a structural birefringence. The structural birefringence is clearly different from the orientation birefringence generated by molecular orientation caused by stretching in that the birefringence is generated even when each phase is formed of an isotropic medium.

Whether the structural birefringence is actually generated may be confirmed by measuring the optical properties of the film. An unstretched film formed by a conventional method such as extrusion molding, press processing, or solvent casting usually has a random molecular orientation and thus has values of Re and Rth of close to almost zero. On the other hand, in an unstretched film in which the structural birefringence is generated, values of Re and Rth thereof are observed to be larger than those of the normal unstretched film formed by the conventional method. Thus, generation of the structural birefringence can be confirmed by measuring such values. Generation of the structural birefringence can be more surely confirmed by additionally performing structure observation using an electron microscope or small angle X-ray scattering.

The interphase distance in the phase separation structure is preferably 200 nm or less, more preferably 150 nm or less, and still more preferably 100 nm or less, and is greater than 0 nm. For example, it may be set to 10 nm or more. The term "interphase distance" refers to an interval between adjacent cylinders. As the interphase distance, a value obtained by fitting to a theoretical curve a scattering pattern obtained by the measurement of the small angle X-ray scattering may be adopted.

The interphase distance may be adjusted by adjusting the molecular structure of the copolymer P. For example, the adjustment may be performed by adopting a block copolymer as the copolymer P and appropriately adjusting factors such as a length of the blocks (A) and (B).

The diameter of the cylinder in the phase separation structure is preferably 50 nm or less, more preferably 40 nm or less, and further more preferably 30 nm or less, and is more than 0 nm. For example, it may be set to 10 nm or more.

When the interphase distance and the size of the cylinder in the phase separation structure are sufficiently smaller than the visible light as described above, the structural birefringence can be generated. Further, this can prevent coloring of the film and a reduction in a light transmittance caused by an increase in haze.

[1.3. Conditions to be Satisfied by Phase Difference Film]
[1.3.1. Condition (1)]

In the phase difference film according to an embodiment of the present invention, $D(A)>D(B)$, and $f(B)>0.5$, and the direction giving the maximum refractive index among in-plane directions and the orientation direction of the cylinder in the phase separation structure are parallel to each other.

Herein, "f(B)" represents the total weight ratio of the polymerization unit B in the copolymer P. The total weight ratio of the polymerization unit B in the copolymer P refers to a ratio of the total weight of the polymerization unit B included in the copolymer P relative to the weight of the copolymer P.

The f(B) may be determined by measuring the NMR spectrum of the copolymer P.

When f(B) is larger than 0.5, usually the phase (B) becomes a matrix and the phase (A) shows a cylindrical structure in a cylindrical phase separation structure.

Herein, $D(A)=ReA(450)/ReA(550)$, $D(B)=ReB(450)/ReB(550)$,
 wherein ReA(450) represents an in-plane direction retardation (nm) of the film (A) formed from the polymer (A) composed of the polymerization unit A measured at a wavelength of 450 nm,
 ReA(550) represents an in-plane direction retardation (nm) of the film (A) measured at a wavelength of 550 nm,
 ReB(450) represents an in-plane direction retardation (nm) of the film (B) formed from the polymer (B) composed of the polymerization unit B measured at a wavelength of 450 nm, and
 ReB(550) represents an in-plane direction retardation (nm) of the film (B) measured at a wavelength of 550 nm.

The polymer (A) composed of the polymerization unit A may be obtained by polymerization of a monomer corresponding to the polymerization unit A, and further performing a reaction such as hydrogenation, if necessary. The polymer (B) composed of the polymerization unit B may be obtained by polymerization of a monomer corresponding to the polymerization unit B, and further performing a reaction such as hydrogenation, if necessary. When the copolymer P has the block (A) and the block (B), the polymer (A) and the polymer (B) may be obtained in the same manner as in the producing methods of the block (A) and the block (B), respectively.

The film (A) may be produced as follows. First, the polymer (A) is crushed into powders and the powders are placed between two polyimide films to form a layered body. The layered body is pressurized, and then the polyimide films are removed to produce a pressed film (A) having a thickness of 100 The pressurizing conditions may be a temperature of 280° C., a pressure of 40 MPa, and a time period of 2 minutes. Subsequently, the pressed film (A) is uniaxially stretched at a ratio of 1.5 times to obtain a film (A).

The film (B) may be produced as follows. First, the polymer (B) is crushed into powders and the powders are placed between two polyimide films to form a layered body. The layered body is pressurized, and then the polyimide films are removed to produce a pressed film (B) having a thickness of 100 The pressurizing conditions may be a temperature of 25° C., a pressure of 20 MPa, and a time period of 2 minutes. Subsequently, the pressed film (B) is uniaxially stretched at a ratio of 3 times to obtain a film (B).

The orientation direction of the cylinder, that is, the orientation direction of the long axis of the cylinder, may be determined by fitting to a theoretical curve a scattering pattern obtained by the measurement of the small angle X-ray scattering.

The direction giving the maximum refractive index among the in-plane directions of the phase difference film, that is, the direction giving nx, may be measured by a phase difference measurement device.

The phase difference film of the present embodiment satisfying the condition (1) can have the reverse wavelength dispersion property.

When the phase difference film satisfies the condition (1), f(B) is usually more than 0.5, preferably 0.55 or more, and more preferably 0.6 or more, and is preferably less than 0.9, more preferably 0.85 or less, further more preferably 0.82 or less, and particularly preferably 0.80 or less. f(B) may be adjusted by appropriately adjusting the material and the production operation for producing the copolymer P.

The phase difference film satisfying the condition (1) may be obtained, for example, by molding the resin C including the copolymer P satisfying $D(A)>D(B)$ and $f(B)>0.5$ into a film shape by a melt extrusion method.

From the viewpoint of arranging the direction giving nx of the phase difference film and the orientation direction of the cylinder in parallel, the draft ratio (die lip gap/film thickness) in the melt extrusion method is preferably 5 or more, and more preferably 10 or more, and is preferably 20 or less. The ratio is preferably 5 or more and 20 or less, and more preferably 10 or more and 20 or less.

In an embodiment, the resin temperature (resin extrusion temperature Te) in the melt extrusion method is preferably 220° C. or higher, more preferably 230° C. or higher, and further more preferably 240° C. or higher, and is preferably 290° C. or lower, more preferably 280° C. or lower, and further more preferably 270° C. or lower.

In another embodiment, the resin extrusion temperature Te is preferably Td+110° C. or higher, more preferably Td+115° C. or higher, and particularly preferably Td+120° C. or higher, and is preferably Td+170° C. or lower, more preferably Td+165° C. or lower, and particularly preferably Td+160° C. or lower. "Td" described above represents the thermal softening temperature of the copolymer P.

[1.3.2. Condition (2)]

Further, in the phase difference film according to another embodiment of the present invention, D(A)>D(B) and f(A) >0.5, and the direction giving the maximum refractive index among the in-plane directions and the orientation direction of the cylinder in the phase separation structure are orthogonal to each other.

Herein, "f(A)" represents the total weight ratio of the polymerization unit A in the copolymer P. The total weight ratio of the polymerization unit A in the copolymer P refers to a ratio of the total weight of the polymerization unit A included in the copolymer P relative to the weight of the copolymer P.

f(A) may be determined by measuring the NMR spectrum of the copolymer P.

When f(A) is larger than 0.5, usually the phase (A) becomes a matrix and the phase (B) shows a cylindrical structure in a cylindrical phase separation structure.

Further, D(A) and D(B) have the same meaning as defined in the description of the aforementioned condition (1).

The orientation direction of the cylinder is generally parallel to the in-plane direction.

The orientation direction of the cylinder and the direction giving the maximum refractive index among the in-plane directions of the phase difference film may be determined by the same method as described in the aforementioned condition (1).

The phase difference film of the present embodiment satisfying the condition (2) can have the reverse wavelength dispersion property.

When the phase difference film satisfies the condition (2), f(A) is usually more than 0.5, preferably 0.55 or more, and more preferably 0.60 or more, and is preferably less than 0.9, more preferably 0.85 or less, further more preferably 0.82 or less, and particularly preferably 0.80 or less. f(A) may be adjusted by appropriately adjusting the material and the production operation for producing the copolymer P.

The phase difference film satisfying the condition (2) may be obtained, for example, by molding the resin C including the copolymer P satisfying D(A)>D(B) and f(A)>0.5 into a film shape by a melt extrusion method and then stretching the extruded film thus obtained.

As the stretching method of the extruded film, a known method may be used. However, at least stretching is preferably performed in a conveyance direction of the extruded film. The stretching ratio in the conveyance direction is preferably 1.1 times or more, more preferably 1.2 times or more, further more preferably 1.3 times or more, particularly preferably 1.5 times or more, and most preferably 1.7 times or more, and is preferably 5.0 times or less, more preferably 4.9 times or less, further more preferably 4.8 times or less, and possibly 3.0 times or less.

In an embodiment, the temperature during stretching (stretching temperature $T_E$) is preferably (Tg(C)−5)° C. or higher, and more preferably Tg(C)° C. or higher, and is preferably (Tg(C)+30)° C. or lower, more preferably (Tg(C)+25)° C. or lower, and still more preferably (Tg(C)+20)° C. or lower.

Herein, "Tg(C)" means the glass transition temperature (° C.) of the resin C.

In another embodiment, the stretching temperature $T_E$ is preferably Td or higher, more preferably Td+1° C. or higher, and particularly preferably Td+2° C. or higher, and is preferably Td+20° C. or lower, more preferably Td+19° C. or lower, and particularly preferably Td+18° C. or lower. The Td represents a thermal softening temperature of the copolymer P.

[1.4. Refractive Index Difference Between Phase (A) and Phase (B)]

When the refractive index difference between the phase (A) and the phase (B) is larger, the structural birefringence can be generated more efficiently. Thus, an absolute value of the difference between the refractive index n(a) of the polymer (A) formed from the polymerization unit A and the refractive index n(b) of the polymer (B) formed from the polymerization unit B, (|n(a)−n(b)|), is preferably a large value, and it may be set to preferably 0.05 or more, more preferably 0.10 or more, and further more preferably 0.15 or more.

The refractive index n(a) may be obtained by producing the pressed film (A) from the polymer (A) as described above and measuring the refractive index of the pressed film (A). The refractive index n(b) may be obtained by producing the pressed film (B) from the polymer (B) as described above and measuring the refractive index of the pressed film (B).

[1.5. Other Properties of Phase Difference Film]

The in-plane direction retardation Re of the phase difference film may be freely set depending on the use application of the phase difference film. As to the phase difference film, the in-plane direction retardation Re(550) measured at a wavelength of 550 nm is preferably 100 nm or more, more preferably 110 nm or more, and further more preferably 120 nm or more. The larger the in-plane direction retardation Re(550) is, the more preferable it is, but it can be set to 300 nm or less, and it is preferably 100 nm or more and 300 nm or less. For example, when it is desired to give functions as a λ/4 plate to the phase difference film, the in-plane direction retardation Re of the phase difference film can be set to 120 nm to 160 nm. Further, for example, when it is desired to give functions as a λ/2 plate to the phase difference film, the in-plane direction retardation Re of the phase difference film can be set to 250 nm to 290 nm.

In the phase difference film, a ratio (Re(450)/Re(550)) of the in-plane direction retardation Re(450) measured at a wavelength of 450 nm relative to the in-plane direction retardation Re(550) measured at a wavelength of 550 nm is preferably 0 or more, more preferably 0.70 or more, still more preferably 0.71 or more, and particularly preferably 0.72 or more, and is preferably less than 1, more preferably 0.95 or less, still more preferably 0.94 or less, particularly preferably 0.93 or less, and most preferably 0.90 or less. The ratio is more preferably 0 or more and less than 1, and more preferably satisfies the following formula (4).

$$0.70 \leq Re(450)/Re(550) \leq 0.95 \quad (4)$$

When the ratio (Re(450)/Re(550)) falls within the aforementioned range, it is possible to suppress a large change in the optical properties of the phase difference film depending on the wavelength of light to be transmitted.

Further, in an embodiment, the in-plane direction retardations Re(550) and Re(650) of the phase difference film at the measurement wavelengths of 550 nm and 650 nm, respectively, preferably satisfy Re(550)<Re(650), and more preferably satisfy the following formula (5).

$$1.02 \leq Re(650)/Re(550) \leq 1.20 \quad (5)$$

More particularly, Re(650)/Re(550) is preferably 1.02 or more, and more preferably 1.03 or more, and is preferably 1.20 or less, and more preferably 1.19 or less.

The phase difference film having a reverse wavelength dispersion property as described above can exhibit its optical function in a wide wavelength range. For example, a phase difference film that can function as a λ/4 plate at a certain wavelength can function as a λ/4 plate in a wide wavelength range including that wavelength. Therefore, when the phase difference film is provided to the image display device, it is possible to improve the display characteristics of the image display device.

The thickness-direction retardation Rth of the phase difference film may be optionally set depending on the use application of the phase difference film. Specifically, the thickness-direction retardation Rth of the phase difference film is preferably −95 nm or more, more preferably −90 nm or more, and particularly preferably −85 nm or more, and is preferably 180 nm or less, more preferably 170 nm or less, and particularly preferably 160 nm or less.

The birefringence Δn of the phase difference film may be optionally set depending on the use application of the phase difference film. Specifically, the birefringence Δn of the phase difference film may be preferably 0.0001 or more, more preferably 0.0002 or more, and particularly preferably 0.0003 or more, and is preferably 0.0021 or less, more preferably 0.002 or less, and particularly preferably 0.0019 or less. The birefringence Δn is obtained by dividing the in-plane direction retardation Re by the thickness d.

The NZ factor of the phase difference film may be optionally set depending on the use application of the phase difference film. Specifically, the NZ factor of the phase difference film is preferably more than −0.5, more preferably −0.1 or more, and particularly preferably 0 or more, and is preferably less than 2.0, more preferably 1.8 or less, and particularly preferably 1.7 or less.

The thickness of the phase difference film may be optionally set depending on the use application of the phase difference film. Specifically, the thickness of the phase difference film is preferably 5 μm or more, more preferably 10 μm or more, and particularly preferably 15 μm or more, and is preferably 270 μm or less, more preferably 260 μm or less, and particularly preferably 250 μm or less.

[1.6. Method for Producing Phase Difference Film]

The above-described phase difference film may be produced by any method as described above. The phase difference film is preferably produced by a melt extrusion method, and more preferably by the following producing method. The producing method described below is particularly preferably used for producing the phase difference film satisfying the foregoing condition (2).

In the method for producing a phase difference film according to an embodiment of the present invention, the phase difference film is produced using the resin C. The producing method includes a first step of performing melt extrusion of the resin C onto a cooling roll to obtain an intermediate film, and a second step of subjecting the intermediate film to a stretching treatment.

FIG. 1 is a schematic diagram schematically illustrating a scheme of producing a phase difference film 10 by a producing method according to an embodiment of the present invention. In FIG. 1, an example using a die 110 as a mold, an extrusion molding apparatus 100 including a cooling roll 120 provided to be rotatable in the circumferential direction, and a stretching apparatus 200 to produce a long-length phase difference film 10 will be described. However, the present invention is not limited to the example illustrated in FIG. 1.

As in the example illustrated in FIG. 1, in the first step, a resin 20 as the resin C in a molten state is usually extruded from the die 110 onto the cooling roll 120 into a film shape. The resin 20 extruded from the die 110 is received by the cooling roll 120 which rotates in the circumferential direction, and cooled. Upon cooling, the resin 20 is cured to obtain an intermediate film 30.

The obtained intermediate film 30 is conveyed by the rotation of the cooling roll 120, and is sent to the stretching apparatus 200 to be subjected to the second step. In the second step, the intermediate film 30 is subjected to a stretching treatment. Since the copolymer P included in the intermediate film 30 is oriented by the stretching treatment, the phase difference film 10 having a desired retardation is obtained. The producing method of this embodiment is performed so as to satisfy the following requirement 1.

Requirement 1: The thermal softening temperature Td of the copolymer P and the temperature Tc of the cooling roll 120 satisfy the following formula (3).

$$Tc < Td - 50° C. \qquad (3)$$

In addition to the requirement 1, the producing method of the present embodiment may satisfy the above-described condition (1), and may further satisfy the following formula (6).

$$0.5 < f(B) \le 0.85 \qquad (6)$$

In addition to the requirement 1, the producing method of another embodiment may satisfy the above-described condition (2), and may further satisfy the following formula (7).

$$0.5 < f(A) \le 0.85 \qquad (7)$$

The first step and the second step will be described in more detail.

(First Step (Melt Extrusion))

In the first step, melt extrusion of the resin C containing the copolymer P onto a cooling roll is performed to obtain an intermediate film.

Usually, the molten resin C is supplied to a die such as a T die and extruded using an extruder such as a twin screw extruder. The molten resin C is continuously molded into a film shape by extrusion from the die. In the following description, the resin C in the molten state molded in this manner is sometimes referred to as a "molten resin film" focusing on its shape.

The extrusion temperature Te of the resin C in the first step is preferably Td+110° C. or higher, more preferably Td+115° C. or higher, and particularly preferably Td+120° C. or higher, and is preferably Td+170° C. or lower, more preferably Td+165° C. or lower, and particularly preferably Td+160° C. or lower. The Td represents the thermal softening temperature of the copolymer P. When the extrusion temperature Te falls within the above-described range, the phase difference film having desired optical properties can be particularly easily produced. Usually, molding of the resin C can be smoothly performed when the extrusion temperature Te is equal to or higher than the lower limit value of the above-described range, and degradation of the resin can be suppressed when the extrusion temperature Te is equal to or lower than the upper limit value. The extrusion temperature Te of the resin C is the temperature of the resin C at the time of extrusion from the mold, and usually corresponds to the temperature at the lip of the die.

The molten resin film as the molded resin C is continuously guided to the cooling roll and received by the peripheral surface of the cooling roll. Usually, the cooling roll is rotated in the circumferential direction about its axis of rotation. Therefore, the molten resin film is conveyed along the conveying path on the peripheral surface of the cooling roll and simultaneously cooled. Although a part of heat of the resin C is dissipated into the surrounding air, almost all thereof is transferred to the cooling roll, whereby the cooling of the resin C is achieved. Then, the resin C is cured by such cooling, so that the intermediate film formed of the resin C is obtained.

In the first step according to the present embodiment, the temperature Tc of the cooling roll satisfies the above-described formula (3). Herein, the temperature Tc of the cooling roll represents the temperature of the peripheral surface of the cooling roll. More particularly, the temperature difference Td–Tc between the temperature Tc of the cooling roll and the thermal softening temperature Td of the copolymer P is usually higher than 50° C., preferably higher than 50.2° C., and particularly preferably higher than 50.5° C. If the temperature difference Td–Tc is higher than the above-described lower limit value, it is possible to easily perform the production of the phase difference film having a reverse wavelength dispersion property. Furthermore, usually, when the temperature difference Td–Tc is higher than the above-described lower limit value, the optical properties other than the wavelength dispersion property of the phase difference film can also be easily adjusted to a desired value. The upper limit of the temperature difference Td–Tc is not particularly limited, and is preferably lower than 100° C., more preferably lower than 95° C., and particularly preferably lower than 90° C. When the temperature difference Td–Tc is lower than the above-described upper limit, control of the temperature of the cooling roll is facilitated, so that it is possible to easily perform the production of the phase difference film having a reverse wavelength dispersion property.

The surface on the cooling roll side of the molten resin film received on the cooling roll as described above may be in contact with the peripheral surface of the cooling roll or may be apart therefrom. For example, by an air layer formed between the surface of the molten resin film and the peripheral surface of the cooling roll, the surface of the molten resin film and the peripheral surface of the cooling roll may be apart from each other. When an air layer is formed, the molten resin film is supported by the cooling roll through the air layer. Even in this case, however, as the air layer is thin, the molten resin film is cooled by the cooling roll. When an air layer is formed, pinning of the molten resin film may usually be effected at portions of its width direction (for example, at its ends in the width direction) to be in contact with the peripheral surface of the cooling roll, and the rest portions thereof may be apart from the peripheral surface of the cooling roll at other portions. The pinning may be performed by, for example, electrostatic pinning, air pinning, pinning with a roller, or the like.

The thickness of the intermediate film obtained in the first step may be appropriately set depending on the optical properties of the phase difference film to be produced. Specifically, the thickness of the intermediate film is preferably 10 μm or more, more preferably 20 μm or more, and particularly preferably 30 μm or more, and is preferably 300 μm or less, more preferably 290 μm or less, and particularly preferably 280 μm or less.

(Second Step (Stretching Treatment))

In the second step, the intermediate film obtained in the first step is subjected to a stretching treatment. By this stretching treatment, optical properties such as retardation are exhibited, so that a phase difference film is obtained.

The stretching treatment is usually performed by a flat stretching method in which the intermediate film is stretched in the in-plane direction. Examples of the flat stretching method may include a uniaxial stretching method and a biaxial stretching method. The uniaxial stretching method is a stretching method in which the intermediate film is stretched in one direction within its plane. Examples of the uniaxial stretching method may include a free-width uniaxial stretching method and a constant-width uniaxial stretching method. The biaxial stretching method is a stretching method in which the intermediate film is stretched in two directions within its plane. Examples of the biaxial stretching method may include a sequential biaxial stretching method and a simultaneous biaxial stretching method. In the biaxial stretching method, the stretching in each direction may be free width stretching or may be constant width stretching. More specific examples of the sequential biaxial stretching method may include a full tenter method and a roll tenter method.

The stretching temperature $T_E$ of the stretching treatment in the second step may be appropriately set depending on the optical properties of the phase difference film to be produced. The specific stretching temperature $T_E$ is preferably Td or higher, more preferably Td+1° C. or higher, and particularly preferably Td+2° C. or higher, and is preferably Td+20° C. or lower, more preferably Td+19° C. or lower, and particularly preferably Td+18° C. or lower. The Td represents the thermal softening temperature of the copolymer P. When the stretching temperature $T_E$ is equal to or higher than the lower limit value of the above-described range, the stretching treatment can be smoothly performed. When the stretching temperature $T_E$ is equal to or lower than the upper limit value of the above-described range, desired optical properties can be easily exhibited in the phase difference film by the stretching treatment.

The stretching ratio in the stretching treatment of the second step may be appropriately set in accordance with the optical properties of the phase difference film to be produced. The specific stretching ratio is preferably 1.1 times or more, more preferably 1.2 times or more, and particularly preferably 1.3 times or more, and is preferably 5.0 times or less, more preferably 4.9 times or less, and particularly preferably 4.8 times or less. When the stretching ratio falls within the above-described range, the phase difference film having desired optical properties can be particularly easily produced. When the stretching ratio is in such a range, a phase difference film applicable to a wide range of use applications such as a λ/4 plate and a λ/2 plate can be obtained.

When the stretching direction in the second step includes two or more directions, the stretching ratio represents the total stretching ratio obtained by multiplying the stretching ratios in respective directions.

The stretching treatment may be performed on a line continuous with the production line of the intermediate film. Alternatively, the intermediate film may be temporarily wound into a take-up film roll, and thereafter, the intermediate film may be unwound from the film roll and subjected to a stretching treatment.

(Optional Step)

In the method for producing the phase difference film, an optional step may be further performed in combination with the first step and the second step described above. Examples of the optional step may include a trimming step of removing the end portions in the width direction of the intermediate film or the phase difference film; a collecting step of collecting the phase difference film by winding; and a step of forming an optional layer on the phase difference film.

According to the producing method described above, a phase difference film having a reverse wavelength dispersion property can be easily obtained.

[2. Use Application]

The phase difference film of the present embodiment may be used as a component of a display device such as a liquid crystal display device or an organic electroluminescent display device.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

Examples A1 to A3 and Comparative Examples A1 and A2

[Evaluation Method]
(Method for Measuring Thermal Softening Temperature)

The resin to be measured was molded into a film of 5 mm×20 mm×100 μm to prepare a sample. This sample was subjected to TMA (thermomechanical analysis) measurement using a thermomechanical analyzer ("TMA/SS7100" manufactured by SII NanoTechnology Inc.) to measure the thermal softening temperature. Specifically, the temperature was changed from 20° C. to 180° C. at a rate of 5° C./min while the sample was applied with a tension of 50 mN in its lengthwise direction. The temperature when the length of the sample changed by 3% was determined as the thermal softening temperature.

(Method for Measuring Glass Transition Temperature)

The glass transition temperature Tg was measured using a differential scanning calorimeter ("DSC6220SII" manufactured by NanoTechnology Inc.) in accordance with JIS K 6911 under a condition of a temperature increase rate of 10° C./min.

(Retardation of Film)

The retardation of the film was measured using a phase difference measurement device ("KOBRA-21-ADH" manufactured by Oji Scientific Instruments).

(Phase Separation Structure)

The film was cut to a size of 2 mm×4 mm and 30 sheets of the cut film were stacked in the thickness direction and fixed to a folder, and the scattering pattern thereof was obtained using a small angle X-ray scattering measurement facility (Aichi SR, beam line 8S3) under conditions of a camera length of 4 m, an X-ray energy of 8.2 KeV, a measurement q range of about 0.06 to 3 $nm^{-1}$, and an exposure time per sample of 60 seconds. The obtained scattering pattern was fitted with a theoretical curve to determine the phase separation structure and thereby calculate the radius and the interphase distance of the cylinder.

The X-ray irradiation surface was set to a cross section of the film, and the integration range was set to 20° both in the thickness direction and the direction perpendicular to the thickness direction. The interphase distance was calculated from the data obtained from each integration operation, and the average values of the interphase distance in the thickness direction and the direction perpendicular to the thickness direction and the average value of the radius of the cylinder were adopted as the measurement values.

(Measurement of Re(450)/Re(550))
(Measurement of D(A))
(Production of polymer (A))

To a dry pressure-resistant reaction vessel, in which an internal atmosphere had been replaced with a nitrogen gas, 500 mL of toluene as a solvent and 0.29 mmol of n-butyllithium as a polymerization catalyst were placed, followed by addition of 7.0 g of 2-vinylnaphthalene as a monomer (a), and the resulting mixture was reacted at 25° C. for 1 hour, thereby performing a polymerization reaction. The reaction mixture was poured into a large quantity of 2-propanol to precipitate and collect the polymer. The obtained polymer was measured by GPC to find that the weight-average molecular weight (Mw) was 100,000. The glass transition temperature of the polymer was 145° C.

(Production of Pressed Film (A))

The obtained polymer was crushed into powders by a crushing machine. The powders thus obtained were placed between a pair of polyimide films (each having a thickness of 100 μm) to form a layered body and the layered body was pressurized. The pressurization was performed using an electric heating pressurizing device. The pressurization was performed under conditions of a temperature of 280° C., a pressure of 40 MPa, and a pressurizing time of 2 minutes. After completing the pressurization, the pressure was released and the layered body was cooled to the room temperature in the air. Then, the polyimide films were removed. By these operations, an unstretched pressed film (A) having a thickness of 100 μm was produced.

(Production of Film (A))

The pressed film (A) thus produced was uniaxially stretched at a ratio of 1.5 times using a heating-type tensile testing machine under the conditions of a chuck interval of 80 mm, a stretching speed of 100%/min, and a temperature of 155° C. to obtain a stretched film (film (A)). The in-plane direction retardation Re(550) of the film (A) measured at a wavelength of 550 nm was 140 nm. Further, the value (D(A)) of Re(450)/Re(550) of the film (A) was 1.08.

(Measurement of D(B))
(Production of Polymer (B))

In a dry pressure-resistant reaction vessel, in which an internal atmosphere had been replaced with a nitrogen gas, 500 mL of toluene as a solvent and 0.29 mmol of n-butyllithium as a polymerization catalyst were placed. Then, 21 g of isoprene as a monomer (b) was added and the resulting mixture was further reacted at 25° C. for 1 hour, thereby performing polymerization. The reaction mixture was poured into a large quantity of 2-propanol to precipitate and collect the polymer.

The polymer thus obtained was dissolved in 700 mL of p-xylene to prepare a solution. To this solution, 7.6 g of p-toluenesulfonyl hydrazide was added, and the resulting mixture was reacted at a temperature of 130° C. for 8 hours. By this reaction, double bonds derived from isoprene were hydrogenated. After completing the hydrogenation, the reaction solution was poured into a large quantity of 2-propanol to obtain 20 g of a massive hydrogenated polymer. The hydrogenated polymer thus obtained was measured by gel permeation chromatography (GPC) to find that the weight-average molecular weight was 100,000.

(Production of Pressed Film (B))

A mass of the hydrogenated polymer obtained as the polymer (B) in an amount of 2 g was placed between a pair of polyimide films (each having a thickness of 100 μm) to form a layered body and the layered body was pressurized. The pressurization was performed using the electric heating pressurizing device. The pressurization was performed under conditions of a temperature of 25° C., a pressure of 20 MPa, and a pressurizing time of 2 minutes. After completing the pressurization, the pressure was released and the polyimide films were removed. By these operations, an unstretched pressed film (B) having a thickness of 100 μm was produced.

(Production of Film (B))

The pressed film (B) thus produced was uniaxially stretched at a ratio of 3 times using the heating-type tensile testing machine under the conditions of a chuck interval of 80 mm, a stretching speed of 100%/min, and a temperature of 25° C. to obtain a stretched film (film (B)). The in-plane direction retardation Re(550) of the film (B) measured at a wavelength of 550 nm was 140 nm. Further, the value (D(B)) of Re(450)/Re(550) of the film (B) was 1.03.

(Refractive Index)

The refractive index of the pressed film (A) and the pressed film (B) described above was measured at a wavelength of 550 nm using an ellipsometer "M-2000U" manufactured by J. A. Woollam Japan. The refractive index (n(a)) of the pressed film (A) was 1.67. The refractive index (n(b)) of the pressed film (B) was 1.52.

(Display Performance of Liquid Crystal Display Device) A long-length polarizer having the transmission axis in the width direction (manufactured by Sanritz Corp., trade name "HLC2-5618S", thickness of 180 μm) was prepared. The protective film on one surface side of the polarizer was removed, and the film to be evaluated was bonded to this surface. The bonding was performed such that the slow axis direction of the film to be evaluated and the transmission axis direction of the polarizer formed an angle of 45°. By these operations, a circularly polarizing plate that included the film to be evaluated as one of the protective films on both sides was obtained.

The circularly polarizing plate thus obtained was used to replace a circularly polarizing plate originally included on a view side of a commercially available organic EL display device ("OLED55B6P" manufactured by LG Electronics) to obtain an organic EL display device including the film to be evaluated. For the replacement, the circularly polarizing plate was disposed such that a side provided with the film to be evaluated was disposed on a side of an organic EL element. Further, the transmission axis of the polarizer was set to the same direction as that of the polarizer of the circularly polarizing plate originally included in the organic EL display device.

The display state of the organic EL display device thus obtained was observed from a direction tilted with respect to the display surface (45° relative to the normal direction) at various azimuth angles. The device was evaluated as "good" when the reflectance is reduced in all azimuth angles as compared with the one before replacing, while the device was evaluated as "poor" when the reflectance was equal to or worse than that of the one before replacing in one or more azimuth angles.

Example A1

(Production of Triblock Copolymer P1)

In a dry pressure-resistant reaction vessel, in which an internal atmosphere had been replaced with nitrogen, 500 mL of toluene as a solvent and 0.29 mmol of n-butyllithium as a polymerization catalyst were placed. Then, 3.5 g of 2-vinylnaphthalene as the monomer (a) was added and the resulting mixture was reacted at 25° C. for 1 hour, thereby performing a polymerization reaction of a first stage.

After completing the polymerization reaction of the first stage, 28 g of isoprene as the monomer (b) was added and the resulting mixture was further reacted at 25° C. for 1 hour, thereby performing a polymerization reaction of a second stage. As a result, a diblock copolymer having a block configuration of (2-vinylnaphthalene block)-(isoprene block) was obtained in the reaction mixture.

Subsequently, 3.5 g of 2-vinylnaphthalene as the monomer (a) was further added to the reaction mixture, and the resulting mixture was reacted at 25° C. for 1 hour, thereby performing a polymerization reaction of a third stage. As a result, a reaction mixture containing a triblock copolymer having a block configuration of (2-vinylnaphthalene block)-(isoprene block)-(2-vinylnaphthalene block) was obtained. The reaction mixture was poured into a large quantity of 2-propanol to precipitate and collect the triblock copolymer.

The triblock copolymer thus obtained was dissolved in 700 mL of p-xylene to prepare a solution. To this solution, 7.6 g of p-toluenesulfonyl hydrazide was added, and the resulting mixture was reacted at a temperature of 130° C. for 8 hours. By this reaction, hydrogen was added to double bonds of the isoprene unit. After completing the hydrogenation, the reaction solution was poured into a large quantity of 2-propanol to obtain a triblock copolymer P1 as 32 g of a massive product. The triblock copolymer P1 thus obtained has a block configuration of "polymer block(A)"-"polymer block (B)"-"polymer block (A)". The polymer block (A) includes a 2-vinylnaphthalene unit as the polymerization unit A. The polymer block (B) includes a hydrogenated isoprene unit as the polymerization unit B.

The triblock copolymer P1 thus obtained was analyzed by $^1$H-NMR. As a result, the weight ratio (wA:wB) of the 2-vinylnaphthalene unit and the hydrogenated isoprene unit in the triblock copolymer P1 was 20:80, and thus the weight fraction wA of the polymerization unit A in the triblock copolymer P1 was 0.20. Further, the hydrogenation ratio of the isoprene unit in the triblock copolymer P1 was 99%. The weight-average molecular weight of the triblock copolymer P1 measured by GPC was 100,000. The thermal softening temperature of the triblock copolymer P1 measured by TMA was 100° C. Further, the triblock copolymer P1 exhibited a positive birefringence property.

(Production of Phase Difference Film)

The triblock copolymer P1 obtained in the aforementioned section (Production of triblock copolymer P1) was used as the resin C. The resin C was crushed into powders by a crushing machine. The powders thus obtained were supplied to an extrusion machine having a screw diameter of 40 mmϕ and extruded at a resin temperature of 260° C., from a die having a width of 400 mm and a lip gap of 0.5 mm on a casting drum having a surface temperature of 80° C. at a discharge speed of 20 kg/min. In this manner, a film 1 was obtained as a phase difference film having a width of 300 mm and a thickness of 100 The thickness of the film 1 was adjusted by a rotation speed of the casting drum.

When the film 1 thus obtained was observed by a small angle scattering method in which an X-ray was made incident on the cross section of the film by the aforementioned method, a cylindrical structure oriented in the flow direction, which has the interphase distance of 40 nm and the radius of 10 nm (diameter of 20 nm), was observed.

The in-plane direction retardation Re(550) and the thickness-direction direction retardation Rth(550) of the obtained film 1 were measured at a wavelength of 550 nm to find that Re(550)=140 nm and Rth(550)=50 nm. Thus, it is deduced that the structural birefringence is generated by the cylindrical phase separation structure. Further, the direction giving the maximum refractive index nx among the in-plane directions (in-plane slow axis) coincided with the flow direction of the film 1. Thus, the orientation direction of the cylinder in the phase separation structure was parallel to the direction giving nx.

Further, the film 1 satisfied Re(450)/Re(550)=0.80<1 and thus exhibited a reverse wavelength dispersion property.

The obtained film (phase difference film) 1 functioning as a λ/4 plate was installed in an organic EL display device as a circularly polarizing plate by the aforementioned method and display performance of the organic EL display device was evaluated. As a result, the display characteristics of the organic EL display device were good.

Example A2

(Production of Triblock Copolymer P2)

In a dry pressure-resistant reaction vessel, in which an internal atmosphere had been replaced with nitrogen, 500 mL of toluene as a solvent and 0.29 mmol of n-butyllithium as a polymerization catalyst were placed. Then, 14 g of 2-vinylnaphthalene as the monomer (a) was added and the resulting mixture was reacted at 25° C. for 1 hour, thereby performing a polymerization reaction of a first stage.

After completing the polymerization reaction of the first stage, 7 g of isoprene as the monomer (b) was added and the resulting mixture was further reacted at 25° C. for 1 hour, thereby performing a polymerization reaction of a second stage. As a result, a diblock copolymer having a block configuration of (2-vinylnaphthalene block)-(isoprene block) was obtained in the reaction mixture.

Subsequently, 14 g of 2-vinylnaphthalene as the monomer (a) was further added to the reaction mixture, and the resulting mixture was reacted at 25° C. for 1 hour, thereby performing a polymerization reaction of a third stage. As a result, a reaction mixture containing a triblock copolymer having a block configuration of (2-vinylnaphthalene block)-(isoprene block)-(2-vinylnaphthalene block) was obtained. The reaction mixture was poured into a large quantity of 2-propanol to precipitate and collect the triblock copolymer.

The triblock copolymer thus obtained was dissolved in 700 mL of p-xylene to prepare a solution. To this solution, 7.6 g of p-toluenesulfonyl hydrazide was added, and the resulting mixture was reacted at a temperature of 130° C. for 8 hours. By this reaction, double bonds derived from the isoprene unit were hydrogenated. After completing the hydrogenation, the reaction solution was poured into a large quantity of 2-propanol to obtain 32 g of the triblock copolymer P2 as a massive product. The triblock copolymer P2 has a block configuration of "polymer block (A)"-"polymer block (B)"-"polymer block (A)". The polymer block (A) contains a 2-vinylnaphthalene unit as the polymerization unit A. The polymer block (B) contains a hydrogenated isoprene unit as the polymerization unit B. The triblock copolymer P2 thus obtained was analyzed by $^1$H-NMR. As a result, the weight ratio (wA:wB) of the 2-vinylnaphthalene unit and the hydrogenated isoprene unit in the triblock copolymer P2 was 80:20, and thus the weight fraction wA of the polymerization unit A in the triblock copolymer P2 was 0.80. Further, the hydrogenation ratio of the isoprene unit in the triblock copolymer P2 was 99%. The weight-average molecular weight of the triblock copolymer P2 measured by GPC was 250,000. The thermal softening temperature of the triblock copolymer P2 measured by TMA was 135° C. Further, the triblock copolymer P2 exhibited a positive birefringence property.

(Production of Phase Difference Film)

Production of Extruded Film

The triblock copolymer P2 obtained in the aforementioned section (Production of triblock copolymer P2) was used as the resin C. The resin C was crushed into powders by a crushing machine. The powders thus obtained were supplied to an extrusion machine having a screw diameter of 40 mmφ and extruded, at a resin temperature of 250° C., from a die having a width of 400 mm and a lip gap of 0.5 mm on a casting drum having a surface temperature of 120° C. at a discharge speed of 20 kg/min. Edge portions of the film thus obtained was trimmed to obtain a film 2 having a width of 300 mm and a thickness of 100 μm. The thickness of the film 2 was adjusted by a rotation speed of the casting drum.

When the film 2 thus obtained was observed by a small angle scattering method in which an X-ray was made incident on the cross section of the film by the aforementioned method, a cylindrical structure oriented in the flow direction, which has the interphase distance of 40 nm and the radius of 13 nm (diameter of 26 nm), was observed.

The in-plane direction retardation Re(550) and the thickness-direction retardation Rth(550) of the obtained film 2 were measured at a wavelength of 550 mm to find that Re(550)=200 nm and Rth(550)=110 nm. The direction giving the maximum refractive index nx among the in-plane directions (in-plane slow axis) coincided with the flow direction of the film 2. Thus, it is deduced that the structural birefringence is generated by the cylindrical phase separation structure.

Further, the film 2 satisfied Re(450)/Re(550)=1.2>1 and thus exhibited a positive wavelength dispersion property.

Production of Stretched Film

Subsequently, the film 2 was stretched in the flow direction using a float-type longitudinal stretching machine at a longitudinal stretching ratio of 1.8 times and at a stretching temperature of 135° C. to obtain a film 3.

When the film 3 thus obtained was observed by the small angle scattering method in which an X-ray was made incident on the cross section of the film by the aforementioned method, a cylindrical structure oriented in the flow direction was observed as in the observation of the film before stretching. Further, the interphase distance was 30 nm and the radius of the cylindrical structure was 12 nm (diameter: 24 nm).

The in-plane direction retardation Re(550) and Rth(550) of the obtained film 3 were measured at a wavelength of 550 nm to find that Re(550)=140 nm and Rth(550)=65 nm, and the birefringence was exhibited in the film 3 by both the effects of the structural birefringence by the cylindrical phase separation structure and negative birefringence of the 2-vinylnaphthalene block. The direction giving the maximum refractive index nx among the in-plane directions (in-plane slow axis) coincided with the width direction (a direction orthogonal to the flow direction) of the film 3. Thus, the orientation direction of the cylinder in the phase separation structure was orthogonal to the direction giving nx.

The film 3 satisfied Re(450)/Re(550)=0.81<1 and thus exhibited a reverse wavelength dispersion property.

The obtained film (phase difference film) 3 functioning as a λ/4 plate was installed in an organic EL display device as a circularly polarizing plate by the aforementioned method and display performance of the organic EL display device was evaluated. As a result, the display characteristics of the organic EL display device were good.

Example A3

A film 4 having a width of 300 mm and a thickness of 100 μm was obtained by the same manner as that of the production of the extruded film of Example A2 except that the surface temperature of the casting drum was changed from 120° C. to 83° C. The thickness of the film 4 was adjusted by a rotation speed of the casting drum.

When the film 4 thus obtained was observed by a small angle scattering method in which an X-ray was made incident on the cross section of the film by the aforementioned method, a cylindrical structure oriented in the flow direction, which has the interphase distance of 40 nm and the radius of 13 nm (diameter of 26 nm), was observed.

The in-plane direction retardation Re(550) and the thickness-direction retardation Rth(550) of the obtained film 4 were measured at a wavelength of 550 mm to find that Re(550)=200 nm and Rth(550)=110 nm. The direction giving the maximum refractive index nx among the in-plane directions (in-plane slow axis) coincided with the flow direction of the film 4. Thus, it is deduced that the structural birefringence is generated by the cylindrical phase separation structure.

Further, the film 4 satisfied Re(450)/Re(550)=1.2>1 and thus exhibited a positive wavelength dispersion property.

Subsequently, the film 4 was stretched in the flow direction using a float-type longitudinal stretching machine at a longitudinal stretching ratio of 1.8 times and at a stretching temperature of 135° C. to obtain a film 5.

When the film 5 thus obtained was observed by the small angle scattering method in which an X-ray was made incident on the cross section of the film by the aforementioned method, a cylindrical structure oriented in the flow direction was observed as in the observation of the film before stretching. Further, the interphase distance was 30 nm and the radius of the cylindrical structure was 12 nm (diameter: 24 nm).

The in-plane direction retardation Re(550) and Rth(550) of the obtained film 5 were measured at a wavelength of 550 nm to find that Re(550)=140 nm and Rth(550)=65 nm, and the birefringence was exhibited in the film 5 by both the effects of the structural birefringence by the cylindrical phase separation structure and negative birefringence of the 2-vinylnaphthalene block. The direction giving the maximum refractive index nx among the in-plane directions (in-plane slow axis) coincided with the width direction (a direction orthogonal to the flow direction) of the film 5. Thus, the orientation direction of the cylinder in the phase separation structure was orthogonal to the direction giving nx.

The film 5 satisfied Re(450)/Re(550)=0.81<1 and thus exhibited a reverse wavelength dispersion property.

The obtained film (phase difference film) 5 functioning as a λ/4 plate was installed in an organic EL display device as a circularly polarizing plate by the aforementioned method and display performance of the organic EL display device was evaluated. As a result, the display characteristics of the organic EL display device were good.

Comparative Example A1

(Production of Triblock Copolymer CP1)

In a dry pressure-resistant reaction vessel, in which an internal atmosphere had been replaced with a nitrogen gas, 500 mL of toluene as a solvent and 0.29 mmol of n-butyllithium as a polymerization catalyst were placed. Then, 14 g of 2-vinylnaphthalene as the monomer (a) was added, and the resulting mixture was reacted at 25° C. for 1 hour, thereby performing a polymerization reaction of a first stage.

After completing the polymerization reaction of the first stage, 3.5 g of isoprene as the monomer (b) was added, and the resulting mixture was further reacted at 25° C. for 1 hour, thereby performing a polymerization reaction of a second stage. As a result, a diblock copolymer having a block configuration of (2-vinylnaphthalene block)-(isoprene block) was obtained in the reaction mixture.

Subsequently, 14 g of 2-vinylnaphthalene as the monomer (a) was further added to the reaction mixture, and the resulting mixture was reacted at 25° C. for 1 hour, thereby performing a polymerization reaction of a third stage. As a result, a reaction mixture containing a triblock copolymer having a block configuration of (2-vinylnaphthalene block)-(isoprene block)-(2-vinylnaphthalene block) was obtained. The reaction mixture was poured into a large quantity of 2-propanol to precipitate and collect the triblock copolymer.

The triblock copolymer thus obtained was dissolved in 700 mL of p-xylene to prepare a solution. To this solution, 7.6 g of p-toluenesulfonyl hydrazide was added, and the resulting mixture was reacted at a temperature of 130° C. for 8 hours. By this reaction, double bonds derived from the isoprene unit were hydrogenated. After completing the hydrogenation, the reaction solution was poured into a large quantity of 2-propanol to obtain a triblock copolymer CP1 as 32 g of a massive product. The triblock copolymer CP1 thus obtained has a block configuration of "polymer block (A)"-"polymer block (B)"-"polymer block (A)". The polymer block (A) includes the 2-vinylnaphthalene unit as the polymerization unit A. The polymer block (B) includes the hydrogenated isoprene unit as the polymerization unit B.

The triblock copolymer CP1 thus obtained was analyzed by NMR. As a result, the weight ratio (wA:wB) of the 2-vinylnaphthalene unit and the hydrogenated isoprene unit in the triblock copolymer CP1 was 90:10, and thus the weight fraction wA of the polymerization unit A in the triblock copolymer CP1 was 0.90. Further, the hydrogenation ratio of the isoprene unit in the triblock copolymer CP1 was 99%. The weight-average molecular weight of the triblock copolymer CP1 measured by GPC was 250,000. The thermal softening temperature of the triblock copolymer CP1 measured by TMA was 140° C.

(Production of Phase Difference Film)

Except for the following matter, a film C1 having a width of 300 mm and a thickness of 100 μm was obtained in the same manner as described in (Production of phase difference film) in Example A1.

In place of the triblock copolymer P1, the triblock copolymer CP1 was used as the resin C.

When the film C1 thus obtained was observed by the small angle scattering method in which an X-ray was made incident on the cross section of the film by the aforementioned method, a spherical structure having the interphase distance of 40 nm and the radius of 10 nm (diameter of 20 nm) was observed.

The in-plane direction retardation Re(550) and the thickness-direction retardation Rth(550) of the obtained film C1 were measured at a wavelength of 550 nm to find that Re(550)=5 nm and Rth(550)=7 nm, and generation of the structural birefringence was not observed.

Subsequently, the film C1 was stretched in the flow direction using a float-type longitudinal stretching machine at a longitudinal stretching ratio of 1.8 times and at a stretching temperature of 145° C. to obtain a film C2.

When the film C2 thus obtained was observed by the small angle scattering method in which an X-ray was made incident on the cross section of the film by the aforementioned method, a spherical structure was observed as in the observation of the film before stretching. Further, the interphase distance was 50 nm and the radius of the spherical structure was 13 nm.

The in-plane direction retardation Re(550) and Rth(550) of the obtained film C2 were measured at a wavelength of 550 mm to find that Re(550)=140 nm and Rth(550)=71 nm, and the direction giving the maximum refractive index nx among the in-plane directions (in-plane slow axis) coincided with the width direction of the film C2.

The film C2 satisfied Re(450)/Re(550)=1.1>1 and thus exhibited a positive wavelength dispersion property.

The obtained film (phase difference film) C2 functioning as a λ/4 plate was installed in an organic EL display device as a circularly polarizing plate by the aforementioned method and display performance of the organic EL display device was evaluated. As a result, there were an increase in the reflectivity and a change in the color tone depending on the azimuth angle, and thus the display characteristics of the organic EL display device were poor.

From the results described above, the following findings are revealed.

The film C2 according to Comparative Example A1, which does not have the cylindrical phase separation structure for generating the structural birefringence, does not exhibit the reverse wavelength dispersion property, and the display characteristics of the organic EL display device in which the film C1 is installed are poor.

On the other hand, the film 1 according to Example A1, which satisfies the condition (1) that: f(B) (in Example A1, the weight fraction wB of the polymerization unit B in the triblock copolymer P1)>0.5; and the direction giving nx and the orientation direction of the cylinder in the phase separation structure are in parallel, exhibits the reverse wavelength dispersion property, and the display characteristics of the organic EL display device are good.

Further, the films 3 and 5 according to Examples A2 and A3, which satisfy the condition (2) that: f(A) (in Examples A2 and A3, the weight fraction wA of the polymerization unit A in the triblock copolymer P2)>0.5; and the direction giving nx and the orientation direction of the cylinder in the phase separation structure are orthogonal to each other, exhibit the reverse wavelength dispersion property, and the display characteristics of the organic EL display device are good.

Example B1 to Example B6

[Evaluation Method]
(Method for Measuring Thermal Softening Temperature)

The resin to be measured was molded into a film of 5 mm×20 mm×100 μm to prepare a sample. This sample was subjected to the thermomechanical analysis (TMA) measurement using a thermomechanical analyzer ("TMA/SS7100" manufactured by SII NanoTechnology Inc.) to measure the thermal softening temperature. Specifically, the temperature was changed from 20° C. to 180° C. at a speed of 5° C./min while the sample was applied with a tension of 50 mN in its lengthwise direction. The temperature when the length of the sample changed by 3% was obtained as the thermal softening temperature.

(Method for Measuring Re, Rth, Δn and NZ Factor of Phase Difference Film)

The in-plane direction retardation Re, the thickness-direction retardation Rth, and the NZ factor of the phase difference film were measured at a measurement wavelength of 550 nm using a phase difference meter ("AxoScan" manufactured by Axometrics, Inc.).

Further, the in-plane direction retardation Re of the phase difference film was divided by the thickness d to obtain the birefringence Δn of the phase difference film.

(Method for Evaluating Wavelength Dispersion Property)

The in-plane direction retardations Re(450), Re(550), and Re(650) of the phase difference film were measured at measurement wavelengths of 450 nm, 550 nm, and 650 nm using the phase difference meter ("AxoScan" manufactured by Axometrics, Inc.). From Re(450), Re(550), and Re(650) thus measured, Re(450)/Re(550) and Re(650)/Re(550) were calculated.

(Method for Evaluating Display Characteristics: λ/4 plate (Examples B1 to B5))

As a polarizing plate including a protective film, a polarizer, and a protective film in this order, a long-length polarizing plate having the transmission axis in its width direction ("HLC2-5618S" manufactured by Sanritz Corp., thickness of 180 μm) was prepared. The protective film on one surface side of the polarizing plate was removed, and the phase difference films obtained in Examples B1 to B5 were each bonded to this surface. The bonding was performed such that the slow axis direction of the phase difference film and the transmission axis direction of the polarizing plate formed an angle of 45°. By these operations, circularly polarizing plate samples which included the phase difference films of Examples B1 to B5 as one of the protective films on both sides were obtained.

A commercially available organic EL display device ("OLED55EG9600" manufactured by LG Electronics) including a circularly polarizing plate and an organic EL element in this order from a view side was prepared. The circularly polarizing plate of this organic EL display device was replaced with the circularly polarizing plate sample described above. For the replacement, the circularly polarizing plate sample was disposed such that the phase difference film, the polarizer, and the protective film were disposed in this order from the side of the organic EL element. Further, the transmission axis of the polarizer of the circularly polarizing plate sample was set to the same direction as that of the transmission axis of the polarizer of the circularly polarizing plate originally included in the organic EL display device. An organic EL display device for evaluating display characteristics was obtained in this manner.

The display state of the organic EL display device thus obtained was observed from a direction tilted with respect to the display surface (45° relative to the normal direction) at various azimuth angles. The term "azimuth angle" described herein refers to a component of the aforementioned tilted direction that is parallel to the display surface.

The organic EL display device for evaluation was evaluated as "good" when the reflectance on the display surface is reduced at all azimuth angles as compared with the commercially available organic EL display device before replacing.

The organic EL display device for evaluation was evaluated as "poor" when the reflectance was equal to or worse than that of the commercially available organic EL display device before replacing at one or more azimuth angles.

(Method for Evaluating Display Characteristics: λ/2 Plate (Example B6))

As a polarizing plate including a protective film, a polarizer, and a protective film in this order, a long-length polarizing plate having the transmission axis in its width direction ("HLC2-5618S" manufactured by Sanritz Corp., thickness of 180 μm) was prepared. A protective film on one surface side of the polarizing plate was removed, and the phase difference film obtained in Example B6 was bonded to this surface. The bonding was performed such that the slow axis direction of the phase difference film coincided with the transmission axis direction of the polarizing plate. By these operations, a polarizing plate sample which included the phase difference film of Example B6 as one of the protective films on both sides was obtained.

A commercially available IPS liquid crystal display device ("23MP47HQ" manufactured by LG Electronics) including a light source-side polarizing plate, a liquid crystal cell, and a view-side polarizing plate in this order was prepared. The view-side polarizing plate of this IPS liquid crystal display device was replaced with the polarizing plate sample described above. For the replacement, the polarizing plate sample was disposed such that the phase difference film, the polarizer, and the protective film were disposed in this order from the side of the liquid crystal cell. Further, the transmission axis of the polarizer of the polarizing plate sample was set to the same direction as that of the transmission axis of the polarizer of the view-side polarizing plate originally included in the IPS liquid crystal display device. A liquid crystal display device for evaluating display characteristics was obtained in this manner.

The display state of the liquid crystal display device thus obtained was observed from a direction tilted with respect to the display surface (45° relative to the normal direction) at various azimuth angles.

The IPS liquid crystal display device for evaluation having high contrast at all azimuth angles as compared with the commercially available IPS liquid crystal display device before replacing was evaluated as "good".

Further, the IPS liquid crystal display device for evaluation having contrast equal to or worse than that of the IPS liquid crystal display device before replacing at one or more azimuth angles was evaluated as "poor".

Example B1

(1-1. Production of Hydrogenated Block Copolymer as Copolymer P)

Under a nitrogen atmosphere, in a dry pressure-resistant reaction vessel, in which an internal atmosphere had been replaced with nitrogen, 100 ml of toluene as a solvent and 127 μl (0.20 mmol) of a hexane solution containing 1.6 M of n-butyllithium as a polymerization catalyst were placed. Then, to the heat-resistant reaction vessel, 40 g of a toluene solution containing 25 wt % of 2-vinylnaphthalene as an aromatic vinyl-based compound was added, and the resulting mixture was reacted at 25° C. for 1 hour, thereby performing a polymerization reaction of a first stage. After completing the polymerization reaction of the first stage, a portion of the polymer was collected and subjected to a measurement of the molecular weight by GPC using tetrahydrofuran as a solvent to confirm that the polymer had the number-average molecular weight (Mn) of 33,000, the weight-average molecular weight (Mw) of 34,600, and the molecular weight distribution of 1.05. Further, the conversion ratio of 2-vinylnaphthalene measured by $^1$H-NMR using deuterated chloroform as a solvent was 95%.

Subsequently, to the reaction mixture in the heat-resistant reaction vessel, 5 g of isoprene as a chain conjugated diene-based compound was added, and the resulting mixture was reacted at 50° C. for 0.5 hours, thereby performing a polymerization reaction of a second stage. As a result, a diblock copolymer having a block configuration of (2-vinylnaphthalene block)-(isoprene block) was obtained in the reaction mixture. The GPC measurement revealed that the diblock copolymer had the number-average molecular weight (Mn) of 68,000, the weight-average molecular weight (Mw) of 72,000, and the molecular weight distribution of 1.06. The $^1$H-NMR measurement confirmed that all of 2-vinylnaphthalene remained in the first stage was consumed and the conversion ratio of isoprene was 96%. Further, on the basis of the ratio of integrated values of olefin portions, a microstructure of the isoprene block was constituted of 94% of poly(1,4-isoprene) and 6% of poly(1,2-isoprene) and poly(3,4-isoprene).

Subsequently, to the reaction mixture, 40 g of a toluene solution containing 25 wt % of 2-vinylnaphthalene as an aromatic vinyl-based compound was added, and the resulting mixture was reacted at 25° C. for 17 hours, thereby performing a polymerization reaction of a third stage. After completing the polymerization reaction, 100 μL of methanol was added to obtain a triblock copolymer having a block configuration of (2-vinylnaphthalene block)-(isoprene block)-(2-vinylnaphthalene block) in the reaction mixture. A portion of the triblock copolymer was collected and subjected to a measurement of the molecular weight by GPC to confirm that the triblock copolymer had the number-average molecular weight (Mn) of 106,000, the weight-average molecular weight (Mw) of 117,600, and the molecular weight distribution of 1.11. Further, the $^1$H-NMR measurement confirmed that isoprene remained in the polymerization in the second stage and 2-vinylnaphthalene added in the third stage were all consumed.

The triblock copolymer thus obtained was concentrated, and, after toluene was removed, the concentrated product was dissolved in 700 ml of p-xylene. To this solution, 55 g of p-toluenesulfonyl hydrazide was added, and, after oxygen in the solution was removed by repeatedly performing a combination of pressure reduction and nitrogen substitution operations, the solution was allowed to react at a temperature of 120° C. for 6 hours. By this reaction, double bonds of the isoprene block were hydrogenated. After completing the hydrogenation, a large quantity of acetone and methanol were poured to the reaction solution to obtain a hydrogenated block copolymer as 20 g of a massive product. The hydrogenated block copolymer thus obtained had a triblock configuration of "polymer block [A]"-"polymer block [B]"-"polymer block [A]". The polymer block [A] includes the 2-vinylnaphthalene unit. The polymer block [B] includes the hydrogenated isoprene unit.

The hydrogenated block copolymer obtained as the copolymer P was analyzed by NMR. As a result, the weight ratio (wA:wB) of the 2-vinylnaphthalene unit and the hydrogenated isoprene unit in the hydrogenated block copolymer was 80:20. Thus, the weight fraction wA of the polymer block [A] was 80% (0.80) and the weight fraction wB of the polymer block [B] was 20% (0.20). Further, the hydrogenation ratio of the hydrogenated isoprene unit in the hydrogenated block copolymer was >99%. Further, the number-average molecular weight of the triblock copolymer measured by GPC was 106,000. Further, the thermal softening temperature Td of the hydrogenated block copolymer measured by TMA was 133° C.

(1-2. Melt Extrusion Step)

An intermediate film was produced using the hydrogenated block copolymer described above as the thermoplastic resin C by the melt extrusion method. Specifically, the following operations were performed.

An extrusion molding apparatus including a cooling roll and a die disposed such that therethrough a molten resin can be extruded on the cooling roll was prepared. The thermoplastic resin C was melted using the extruder, supplied to the die, and extruded from the die on the cooling roll in a film shape. The extruded resin C was received on the cooling roll and cooled while being conveyed by the rotation of the cooling roll, thereby being cured. In this manner, an intermediate film having a thickness of 200 μm formed from the hydrogenated block copolymer as the thermoplastic resin C. The extrusion temperature Te of the thermoplastic resin C was 261° C. Further, the temperature Tc of the cooling roll was 78° C.

(1-3. Stretching Treatment Step)

The intermediate film thus obtained was cut to prepare a rectangular film having a size of 80 mm×80 mm. This rectangular film was subjected to free-width uniaxial stretching using a batch-type stretching apparatus (manufactured by Toyo Seiki Kogyo Co. Ltd.). The stretching was performed under conditions of a stretching temperature $T_E$ of 150° C., a stretching ratio of 4.0 times, and a stretching speed of 100%/min. As a result, a phase difference film as a λ/4 plate was obtained. The phase difference film thus obtained was evaluated by the above-described methods.

Examples B2 and B3

In the step (1-2), the thickness of the intermediate film was changed as shown in Table 1. Changing of the thickness of the intermediate film was effected by adjusting the rotation speed of the cooling roll whereby the take-up speed of the molten resin by the cooling roll was adjusted. The method of changing the thickness of the intermediate film is the same in the following Examples.

In the step (1-3), the stretching conditions of the intermediate film were changed as shown in Table 1.

Except for the foregoing matters, phase difference films as a λ/4 plate were produced and evaluated by the same manner as that of Example B1.

Example B4

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 8 g, 8 g and 8 g, respectively. When GPC measurement was performed in the same manner as that in Example B1, it was confirmed that, as to the triblock copolymer before hydrogenation, the number-average molecular weight (Mn) was 120,000, the weight-average molecular weight (Mw) was 133,000, and the molecular weight distribution was 1.11. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 129,000, the weight-average molecular weight (Mw) was 144,000, and the molecular weight distribution was 1.12.

In the step (1-2), the extrusion conditions of the thermoplastic resin C were changed as shown in Table 1.

In the step (1-3), the stretching conditions of the intermediate film were changed as shown in Table 1.

Except for the above-described matters, a phase difference film as a λ/4 plate was produced and evaluated by the same manner as that of Example B1.

Example B5

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 9 g, 6 g and 9 g, respectively. When GPC measurement was performed in the same manner as that in Example B1, it was confirmed that, as to the obtained triblock copolymer before hydrogenation, the number-average molecular weight (Mn) was 95,000, the weight-average molecular weight (Mw) was 106,000, and the molecular weight distribution was 1.12. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 103,000, the weight-average molecular weight (Mw) was 116,000, and the molecular weight distribution was 1.13.

In the step (1-2), the extrusion conditions of the thermoplastic resin were changed as shown in Table 1.

In the step (1-3), the stretching conditions of the intermediate film were changed as shown in Table 1.

Except for the above-described matters, a phase difference film as a λ/4 plate was produced and evaluated by the same manner as that of Example B1.

Example B6

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 9 g, 6 g and 9 g, respectively. When GPC measurement was performed in the same manner as that in Example B1, it was confirmed that, as to the obtained triblock copolymer before hydrogenation, the number-average molecular weight (Mn) was 95,000, the weight-average molecular weight (Mw) was 106,000, and the molecular weight distribution was 1.12. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 103,000, the weight-average molecular weight (Mw) was 116,000, and the molecular weight distribution was 1.13.

In the step (1-2), the extrusion conditions of the thermoplastic resin were changed as shown in Table 1.

In the step (1-3), the stretching conditions of the intermediate film were changed as shown in Table 1.

Except for the above-described matters, a phase difference film as a λ/2 plate was produced by the same manner as that of Example B1. The resulting phase difference film was evaluated by the foregoing methods.

Results of Examples B1 to B6

The results of Examples B1 to B6 are shown in Table below. Meanings of abbreviations in Table below are as follows.

VN: 2-vinylnaphthalene
IP: isoprene
ABA: triblock configuration of [A]-[B]-[A]

TABLE 1

[Results of Examples B1 to B6]

| | Ex. B1 | Ex. B2 | Ex. B3 | Ex. B4 | Ex. B5 | Ex. B6 |
|---|---|---|---|---|---|---|
| Hydrogenated block copolymer | | | | | | |
| Block [A] | VN | VN | VN | VN | VN | VN |
| Block [B] | IP | IP | IP | IP | IP | IP |
| wA | 80 | 80 | 80 | 67 | 75 | 75 |
| wB | 20 | 20 | 20 | 33 | 25 | 25 |
| Block configuration | ABA | ABA | ABA | ABA | ABA | ABA |
| Thermal softening temperature Td (° C.) | 133 | 133 | 133 | 141 | 137 | 137 |
| First step | | | | | | |
| Extrusion type | Melt extrusion | Melt extrusion | Melt extrusion | Melt extrusion | Melt extrusion | Melt extrusion |
| Extrusion temperature Te (° C.) | 261 | 261 | 261 | 288 | 288 | 288 |
| Cooling roll temperature Tc(° C.) | 78 | 78 | 78 | 90 | 86 | 86 |
| Intermediate film thickness (μm) | 200 | 293 | 162 | 142 | 103 | 199 |
| Second step | | | | | | |
| Stretching type | Uniaxial stretching | Uniaxial stretching | Uniaxial stretching | Uniaxial stretching | Uniaxial stretching | Uniaxial stretching |
| Stretching ratio (times) | 4.0 | 1.5 | 1.1 | 1.2 | 1.5 | 1.5 |
| Stretcing temperature $T_E$(° C.) | 150 | 150 | 145 | 150 | 150 | 150 |
| $T_E$ – Td(° C.) | 17 | 17 | 12 | 9 | 13 | 13 |
| Phase difference film | | | | | | |
| Re(nm) | 140.0 | 140.0 | 140.0 | 140.0 | 140.0 | 270.0 |
| Rth(nm) | −81.2 | −64.4 | −81.2 | 151.2 | −15.4 | −29.7 |
| Δn | 0.0014 | 0.0006 | 0.0009 | 0.0011 | 0.0017 | 0.0017 |
| Thickness d(μm) | 100 | 243 | 156 | 131 | 84 | 162 |
| NZ factor | −0.08 | 0.04 | −0.08 | 1.58 | 0.39 | 0.39 |
| Birefringence | Negative | Negative | Negative | Positive | Negative | Negative |
| Re(450)/Re(550) | 0.85 | 0.74 | 0.94 | 0.91 | 0.92 | 0.92 |
| Re(650)/Re(550) | 1.06 | 1.10 | 1.02 | 1.03 | 1.03 | 1.03 |
| Display characteristics | Good | Good | Good | Good | Good | Good |

The aforementioned results show that the phase difference film of the present invention has the reverse wavelength dispersion property and can be easily produced at a low cost.

REFERENCE SIGN LIST

10 phase difference film
20 resin
30 intermediate film
100 extrusion molding apparatus
110 die
120 cooling roll
200 stretching apparatus

The invention claimed is:

1. A phase difference film composed of a resin C containing a copolymer P wherein the copolymer P is a block polymer including a block (A) having a polymerization unit A as a main component and a block (B) having a polymerization unit B as a main component,
   the phase difference film including a cylindrical phase separation structure that generates a structural birefringence,
   the phase separation structure including a phase (A) having the polymerization unit A as a main component and a phase (B) having the polymerization unit B as a main component,
   an interphase distance in the phase separation structure is 200 nm or less, and
   the phase difference film satisfying the following condition (1) or (2),
   Condition (1): D(A)>D(B) and f(B)>0.5, and a direction giving a maximum refractive index among in-plane directions and an orientation direction of a cylinder in the phase separation structure are parallel to each other, and
   Condition (2): D(A)>D(B) and 0.80>f(A)>0.5, and a direction giving a maximum refractive index among in-plane directions and an orientation direction of a cylinder in the phase separation structure are orthogonal to each other,
   wherein
   f(A) represents a total weight ratio of the polymerization unit A in the copolymer P,
   f(B) represents a total weight ratio of the polymerization unit B in the copolymer P,
   D(A)=ReA(450)/ReA(550),
   D(B)=ReB (450)/ReB (550),
   ReA(450) represents an in-plane direction retardation (nm) of a film (A) formed from a polymer (A) composed of the polymerization unit A measured at a wavelength of 450 nm,
   ReA(550) represents an in-plane direction retardation (nm) of the film (A) measured at a wavelength of 550 nm, ReB(450) represents an in-plane direction retardation (nm) of a film (B) formed from a polymer (B) composed of the polymerization unit B measured at a wavelength of 450 nm, ReB(550) represents an in-plane direction retardation (nm) of the film (B) measured at a wavelength of 550 nm, the polymerization unit A is an aromatic vinyl-based unit, and the polymerization unit B is a hydrogenated chain conjugated diene-based unit.

2. The phase difference film according to claim 1, wherein an in-plane direction retardation Re(550) measured at a wavelength of 550 nm is 100 nm or more and 300 nm or less.

3. The phase difference film according to claim 1, wherein a ratio (Re(450)/Re(550)) of an in-plane direction retardation Re(450) measured at a wavelength of 450 nm relative to an in-plane direction retardation Re(550) measured at a wavelength of 550 nm is 0 or more and less than 1.

4. The phase difference film according to claim 1, wherein a diameter of the cylinder in the phase separation structure is 50 nm or less.

5. The phase difference film according to claim 1, wherein an absolute value (|n(a)−n(b)|) of a difference between a refractive index n(a) of the polymer (A) and a refractive index n(b) of the polymer (B) is 0.05 or more.

6. The phase difference film according to claim 1, wherein
the copolymer P includes a triblock copolymer P', and
the triblock copolymer P' is an (A)-(B)-(A) triblock copolymer having the block (A) and the block (B).

7. The phase difference film according to claim 1, wherein
the copolymer P includes a pentablock copolymer P'', and
the pentablock copolymer P'' is an (A)-(B)-(A)-(B)-(A) pentablock copolymer having the block (A) and the block (B).

8. The phase difference film according to claim 1, wherein an intrinsic birefringence of the copolymer P is negative.

9. The phase difference film according to claim 1, satisfying the condition (1) and 0.9>f(B)>0.5.

10. A method for producing the phase difference film according to claim 1, the method comprising:
a first step of performing melt extrusion of the resin C including the copolymer P having the polymerization unit A and the polymerization unit B onto a cooling roll to obtain an intermediate film; and
a second step of subjecting the intermediate film to a stretching treatment, wherein
a thermal softening temperature Td of the copolymer P and a temperature Tc of the cooling roll satisfy the following formula (3):

$Tc < Td - 50° C.$   (3).

11. The method for producing the phase difference film according to claim 10, satisfying the condition (2).

12. The phase difference film according to claim 1, wherein
the polymerization unit A is represented by the general formula (A):

(A)

wherein $R^C$ is a group selected from the group consisting of a phenyl group, a biphenylyl group, a naphthyl group, an anthracenyl group, a phenanthrenyl group, a naphthacenyl group, a pentacenyl group, and a terphenylyl group; $R^1$ to $R^3$ are each independently a group selected from the group consisting of a hydrogen atom and an alkyl group of 1 to 12 carbon atoms, and the polymerization unit B is represented by the general formula (B-1) or the general formula (B-2):

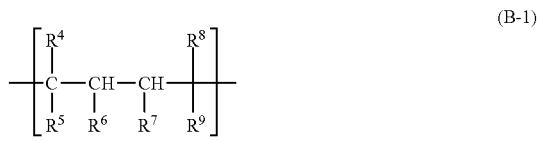

(B-1)

(B-2)

wherein $R^4$ to $R^9$ are each independently a group selected from the group consisting of a hydrogen atom and an alkyl group of 1 to 6 carbon atoms.

13. The phase difference film according to claim 12, wherein $R^C$ is a naphthyl group.

* * * * *